(12) United States Patent
Inoko et al.

(10) Patent No.: US 10,599,024 B2
(45) Date of Patent: Mar. 24, 2020

(54) LIGHT SOURCE APPARATUS INCLUDING MULTIPLE LIGHT SOURCES AND OPTICAL CHARACTERISTIC CONVERSION ELEMENT, AND IMAGE PROJECTION APPARATUS USING LIGHT SOURCE APPARATUS

(71) Applicant: CANON KABUSHIKI KAISHA, Tokyo (JP)

(72) Inventors: Kazuhiro Inoko, Utsunomiya (JP); Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/854,274

(22) Filed: Dec. 26, 2017

(65) Prior Publication Data

US 2018/0180976 A1 Jun. 28, 2018

(30) Foreign Application Priority Data

Dec. 28, 2016 (JP) .................................. 2016-254570
Nov. 27, 2017 (JP) .................................. 2017-226959

(51) Int. Cl.
*G03B 21/20* (2006.01)
*G03B 21/28* (2006.01)

(52) U.S. Cl.
CPC ......... *G03B 21/2013* (2013.01); *G03B 21/20* (2013.01); *G03B 21/204* (2013.01); *G03B 21/208* (2013.01); *G03B 21/2033* (2013.01); *G03B 21/28* (2013.01)

(58) Field of Classification Search
CPC .............. G03B 21/204; G03B 21/2013; G03B 21/2033; G03B 21/208
See application file for complete search history.

(56) References Cited

U.S. PATENT DOCUMENTS

| 7,609,746 B2 * | 10/2009 | Yamauchi | G03B 33/12 372/102 |
| 7,901,083 B2 * | 3/2011 | Destain | G02B 13/0015 349/5 |
| 8,070,295 B2 * | 12/2011 | Destain | G02B 13/0015 349/5 |

(Continued)

FOREIGN PATENT DOCUMENTS

| EP | 2574982 A2 | 4/2013 |
| JP | 2012178319 A | 9/2012 |

(Continued)

OTHER PUBLICATIONS

Extended European Search Report issued in European Appln. No. 17210628.8 dated Feb. 26, 2018.

*Primary Examiner* — Bao-Luan Q Le
(74) *Attorney, Agent, or Firm* — Rossi, Kimms & McDowell LLP

(57) ABSTRACT

A light source apparatus includes a plurality of light sources each having a light emitting area, an optical characteristic converter configured to generate emitting light having a characteristic different from that of incident light from the plurality of light sources, and a first optical system configured to irradiate the incident light on each of a plurality of irradiated areas on the optical characteristic converter. A shape of each irradiation area is non-similar to that of the light emitting area.

20 Claims, 22 Drawing Sheets

(56) References Cited

U.S. PATENT DOCUMENTS

| | | | | |
|---|---|---|---|---|
| 8,075,140 | B2* | 12/2011 | Phillips, III | G02B 27/288 353/20 |
| 8,459,800 | B2* | 6/2013 | Destain | G02B 13/0015 349/5 |
| 8,485,669 | B2* | 7/2013 | Katou | G02B 26/0833 353/122 |
| 8,596,795 | B2* | 12/2013 | Akiyama | G03B 21/2013 353/122 |
| 8,628,199 | B2* | 1/2014 | Akiyama | G02B 19/0057 353/94 |
| 9,134,595 | B2 | 9/2015 | Ogura | |
| 9,411,219 | B2* | 8/2016 | Osaka | G03B 21/2013 |
| 9,488,902 | B2* | 11/2016 | Akiyama | G03B 21/2013 |
| 9,500,937 | B2 | 11/2016 | Tanaka | |
| 9,547,225 | B2* | 1/2017 | Ohno | G02B 26/101 |
| 9,606,348 | B2* | 3/2017 | Cao | F21V 9/40 |
| 9,644,803 | B2* | 5/2017 | Kasugai | F21K 9/64 |
| 2006/0126023 | A1* | 6/2006 | Tan | G03B 21/10 353/31 |
| 2007/0097501 | A1* | 5/2007 | Stern | G03B 21/10 359/453 |
| 2008/0049190 | A1* | 2/2008 | Destain | G02B 13/0015 353/20 |
| 2008/0187012 | A1* | 8/2008 | Yamauchi | G03B 33/12 372/26 |
| 2008/0203901 | A1* | 8/2008 | Bukesov | C09K 11/02 313/503 |
| 2009/0116214 | A1* | 5/2009 | Phillips, III | G02B 27/288 362/84 |
| 2010/0328617 | A1 | 12/2010 | Masuda | |
| 2011/0122371 | A1* | 5/2011 | Destain | G02B 13/0015 353/20 |
| 2012/0002173 | A1* | 1/2012 | Akiyama | G03B 21/2013 353/30 |
| 2012/0008098 | A1* | 1/2012 | Akiyama | G02B 19/0057 353/30 |
| 2012/0019788 | A1* | 1/2012 | Katou | G02B 26/0833 353/33 |
| 2012/0051044 | A1* | 3/2012 | Akiyama | G03B 21/2013 362/233 |
| 2012/0106126 | A1 | 5/2012 | Nojima et al. | |
| 2012/0127435 | A1 | 5/2012 | Kitano et al. | |
| 2012/0133904 | A1* | 5/2012 | Akiyama | G02B 27/102 353/38 |
| 2012/0201030 | A1* | 8/2012 | Yuan | G02B 26/008 362/293 |
| 2012/0287406 | A1* | 11/2012 | Destain | G02B 13/0015 353/20 |
| 2013/0265552 | A1* | 10/2013 | Yoo | F21V 9/08 353/31 |
| 2013/0329421 | A1* | 12/2013 | Finsterbusch | G02B 23/2469 362/231 |
| 2014/0154453 | A1* | 6/2014 | Cao | F21V 9/40 428/64.1 |
| 2014/0253881 | A1* | 9/2014 | Osaka | G03B 21/2013 353/20 |
| 2015/0103320 | A1* | 4/2015 | Iijima | G03B 21/006 353/31 |
| 2015/0226389 | A1* | 8/2015 | Kasugai | G02B 26/008 353/31 |
| 2015/0286120 | A1* | 10/2015 | Ohno | G02B 26/101 353/84 |
| 2015/0323861 | A1* | 11/2015 | Saitou | G03B 21/2013 353/31 |
| 2015/0346579 | A1* | 12/2015 | Hsieh | F21S 10/007 362/84 |
| 2016/0011497 | A1* | 1/2016 | Akiyama | G03B 21/204 353/31 |
| 2016/0033853 | A1* | 2/2016 | Akiyama | G03B 21/2013 353/38 |
| 2016/0057397 | A1 | 2/2016 | Kurosaki | |
| 2016/0170292 | A1* | 6/2016 | Akiyama | G03B 21/208 353/30 |

FOREIGN PATENT DOCUMENTS

| | | |
|---|---|---|
| JP | 2013025247 A | 2/2013 |
| JP | 2014132301 A | 7/2014 |
| JP | 2014209184 A | 11/2014 |

* cited by examiner

| CONDENSER OPTICAL SYSTEM | SHAPE OF LIGHT EMITTING AREA | BEAM SPOT SHAPE |
|---|---|---|
| FIG. 3 | | |

FIG. 4

| CONDENSER OPTICAL SYSTEM | SHAPE OF LIGHT EMITTING AREA | BEAM SPOT SHAPE |
|---|---|---|
| FIG. 5 | 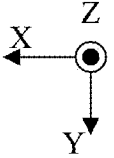 | 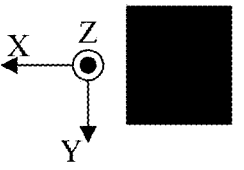 |
FIG. 6
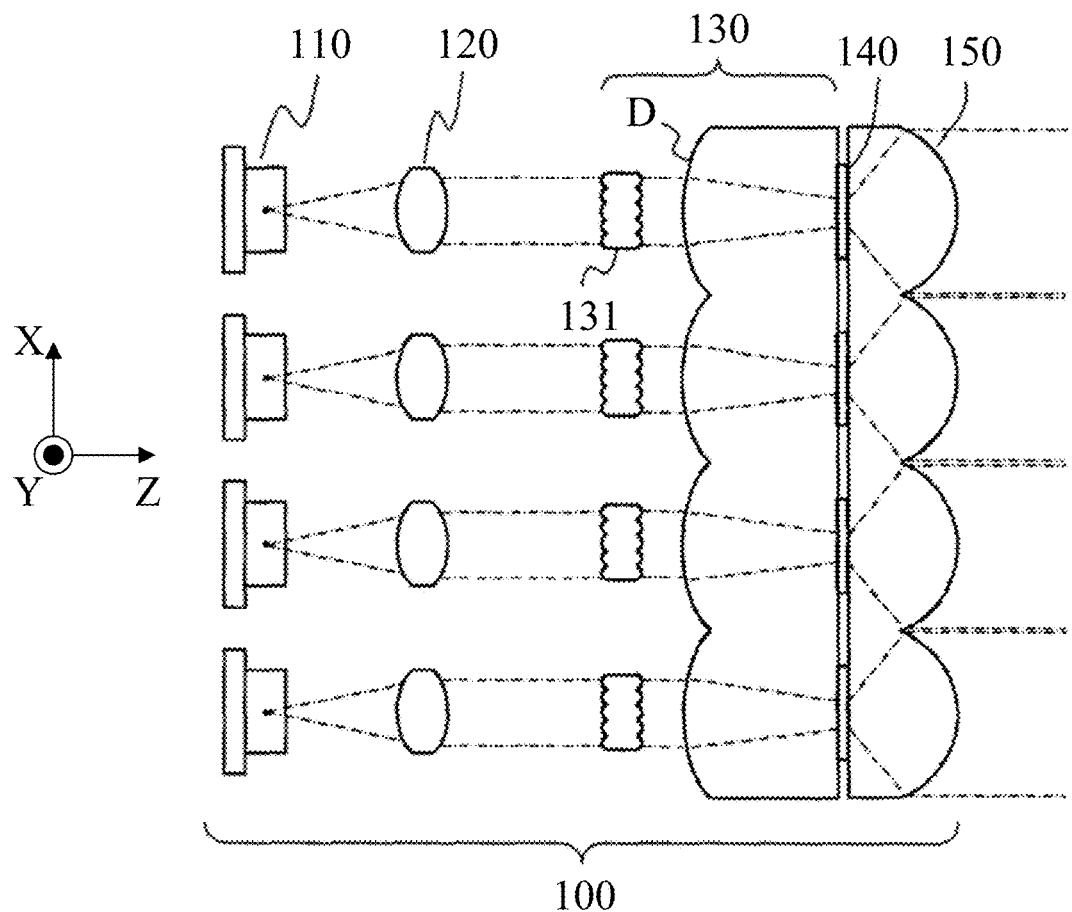
FIG. 7

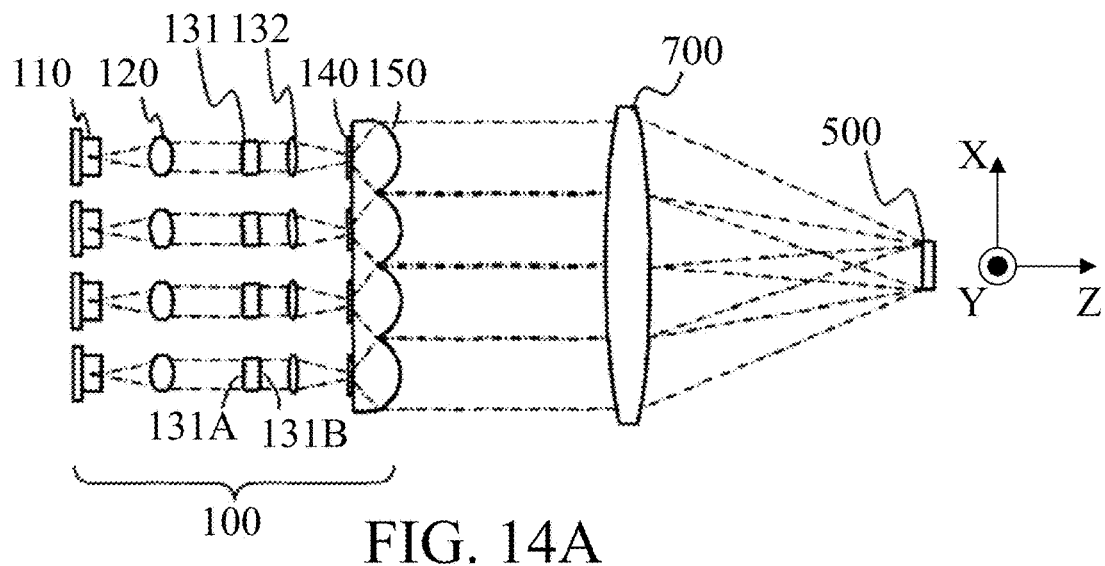
FIG. 14A
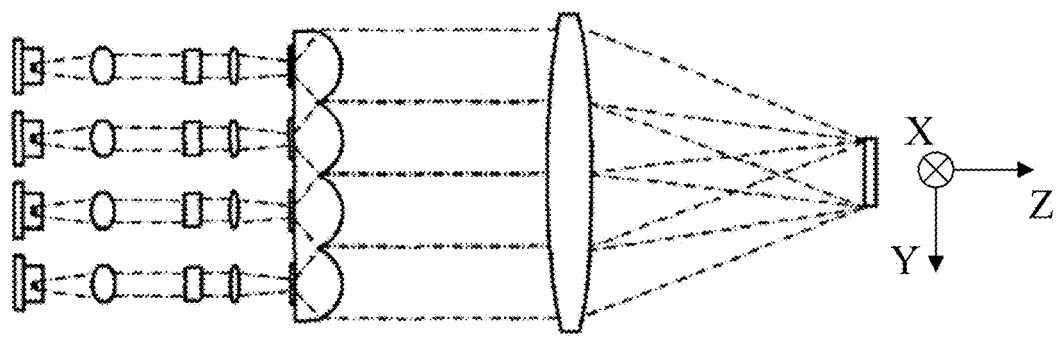
FIG. 14B
| SHAPE OF LIGHT EMITTING AREA | OPTICAL PHENOMENON AT 131B | BEAM SPOT AT 140 | ILLUMINATED AREA AT 500 |
|---|---|---|---|
| ▮ | ▮ LC | ■ | ▨ |
FIG. 15

INTENSITY DISTRIBUTION OF
MICROSTRUCTURAL SURFACE
1302
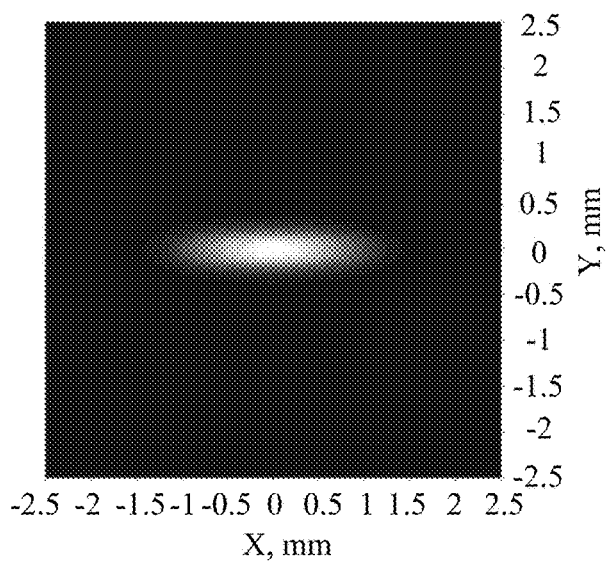
INTENSITY DISTRIBUTION OF
OPTICAL CHARACTERISTIC
CONVERSION ELEMENT 140
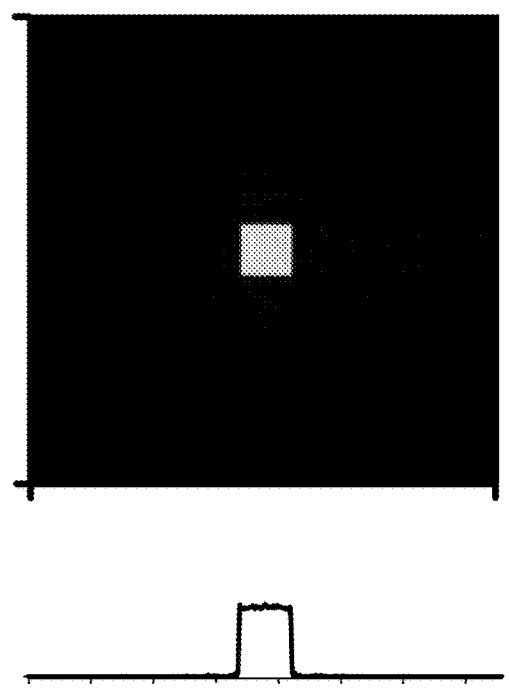
FIG. 22A
FIG. 22B

LIGHT SOURCE APPARATUS INCLUDING MULTIPLE LIGHT SOURCES AND OPTICAL CHARACTERISTIC CONVERSION ELEMENT, AND IMAGE PROJECTION APPARATUS USING LIGHT SOURCE APPARATUS

BACKGROUND OF THE INVENTION

Field of the Invention

The present invention relates to a light source apparatus used for an image projection apparatus (referred to as a "projector" hereinafter) etc.

Description of the Related Art

One projector uses a laser diode ("LD") as a light source, irradiates light from the LD onto an optical characteristic conversion element, such as a fluorescent body, guides emitting light as illumination light from the conversion element to a light modulation element, such as a liquid-crystal display element and a digital micro mirror device, and projects an image. Japanese Patent Laid-Open No. ("JP") 2014-209184 discloses a projector that uses fluorescent light as illumination light generated by exciting a fluorescent body through light from the LD.

The above projector can improve the brightness of the projected image by increasing the number of LDs and an output of each LD. However, the optical characteristic conversion element may lower the conversion efficiency and deteriorate its performance as the incident light density becomes higher. For example, the fluorescent body shows a lower fluorescent conversion efficiency due to the so-called luminance saturation phenomenon as the incident light density increases. Moreover, the fluorescent body deteriorates as the temperature of the fluorescent body rises.

SUMMARY OF THE INVENTION

The present invention provides a light source apparatus that can restrain a conversion efficiency and a performance of an optical characteristic conversion element from lowering and generate bright light, and a projector using the light source apparatus. The present invention provides a light source apparatus and a projector using the same, each which has a high light utilization efficiency.

A light source apparatus according to one aspect of the present invention includes a plurality of light sources each having a light emitting area, an optical characteristic converter configured to generate emitting light having a characteristic different from that of incident light from the plurality of light sources, and a first optical system configured to irradiate the incident light on each of a plurality of irradiated areas on the optical characteristic converter. A shape of each irradiation area is non-similar to that of the light emitting area.

Further features of the present invention will become apparent from the following description of exemplary embodiments with reference to the attached drawings.

BRIEF DESCRIPTION OF THE DRAWINGS

FIG. 4 illustrates a light emitting area of a light source and a light source image (beam spot) formed by the rotationally symmetrical convex lens.

FIG. 6 illustrates the light emitting area of the light source and the light source image (beam spot) formed by the condenser optical system illustrated in FIGS. 5A to 5C.

FIG. 7 illustrates a variation of the first embodiment.

FIGS. 14A and 14B illustrate a configuration of a projector according to a sixth embodiment of the present invention.

FIG. 15 illustrates a relationship between a light source image and a light conversion element according to the sixth embodiment of the present invention.

FIGS. 22A and 22B illustrate an intensity distribution according to the ninth embodiment.

DESCRIPTION OF THE EMBODIMENTS

Referring now to the accompanying drawings, a description will be given of embodiments of the present invention.

First Embodiment

Figure 1A:
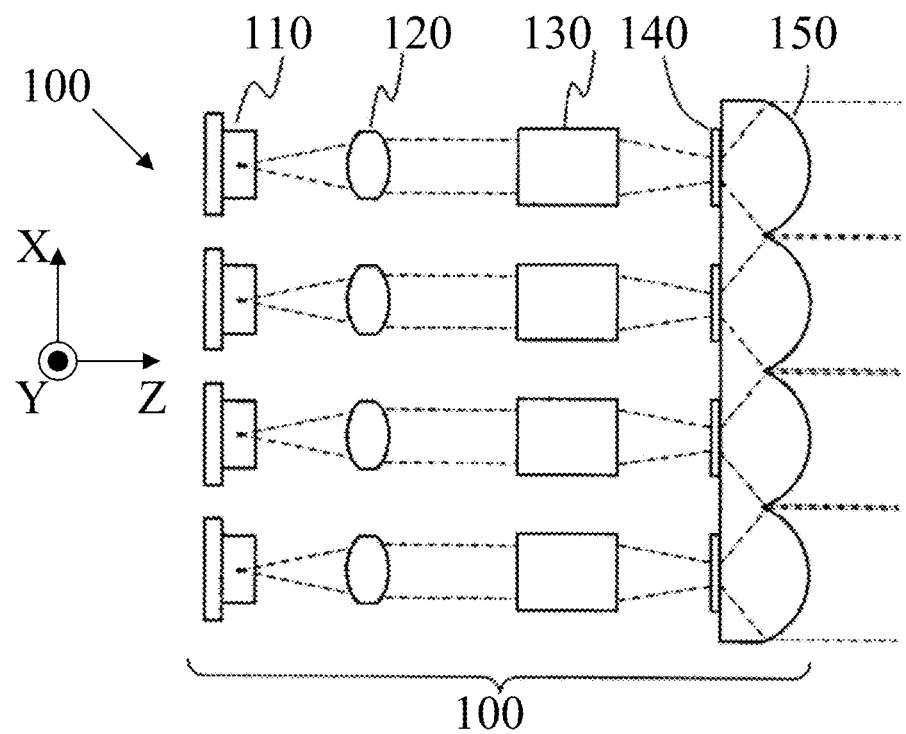
FIGS. 1A and 1B illustrate a configuration of a light source apparatus according to a first embodiment of the present invention.
Figure 1B:
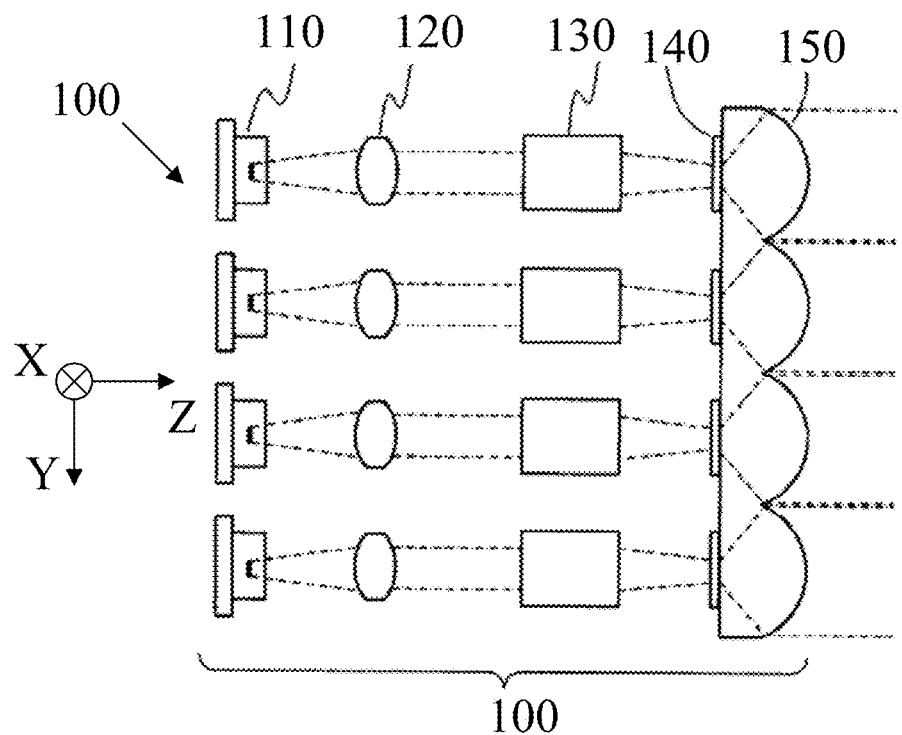

FIGS. 1A and 1B illustrate a configuration of a light source apparatus 100 according to a first embodiment of the present invention. As illustrated, a direction from the left to the right is set to a Z direction. Two mutually orthogonal directions that are orthogonal to the Z direction are set to an X direction (first direction) and a y direction (second direction). FIG. 1A illustrates an XZ section of the light source apparatus 100, and FIG. 1B illustrates a YZ section of the light source apparatus 100.

The light source apparatus 100 includes a plurality of light sources 110, a plurality of collimator lenses 120, a plurality of condenser optical systems (first optical systems) 130, a plurality of optical characteristic conversion elements 140, and a plurality of capturing optical systems 150 (second optical systems). The XZ section and the YZ section are two sections that are orthogonal to each other and parallel to the optical axis in each collimator lens 120, each condenser optical system 130, and each capturing optical system 150.

Figure 2A:
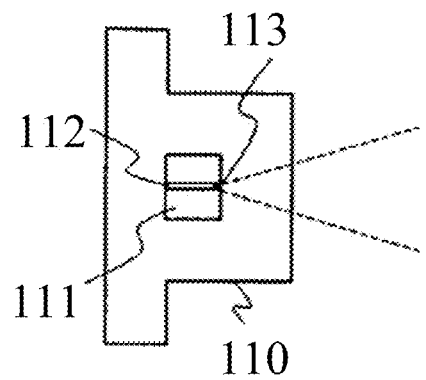
FIGS. 2A to 2C illustrate a laser diode.
Figure 2B:
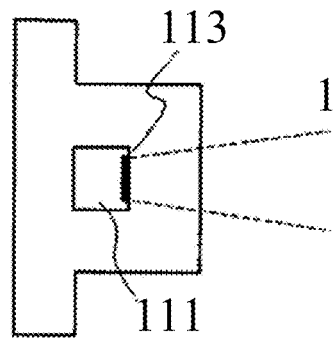
Figure 2C:
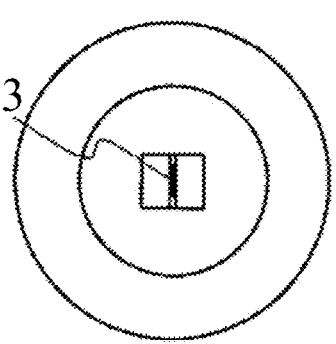

The light source 110 is a solid light source is a laser diode ("LD") in this embodiment. FIGS. 2A to 2C illustrate a configuration of the general LD used for the light source 110. FIG. 2A illustrates an internal configuration of the LD on the XZ section similar to FIG. 1A. The LD includes an optical semiconductor with a double heterostructure in its package. In the optical semiconductor, clad layers 111 hold an active layer 112, and activate atoms for stimulated emissions when receiving an electric field. A laser beam in a resonance state in the active layer is emitted from a cleavage surface 113 on a half-mirror side. The shape of this cleavage surface 113 is the shape of the light emitting area of the LD.

FIG. 2B illustrates an internal structure of the LD on the YZ section. FIG. 2C illustrates the LD on an XY section viewed from the Z direction. As illustrated from FIG. 2C, the light emitting area of the LD has a shape that elongates in the Y direction.

A light beam (laser beam) emitted from the light source ("LD") 110 is a divergent light beam, and is collimated by the collimator lens 120 disposed just after the light source 110. One collimator lens 120 is provided to one light source 110. In other words, the number of light sources 110 is equal to the number of collimators 120.

The light beam emitted from the collimator lens 120 travels in the Z direction, is condensed by the condenser optical system 130 onto the optical characteristic conversion element 140, and is irradiated onto the optical characteristic conversion element 140, forming a beam spot (irradiated area).

Figure 3A:
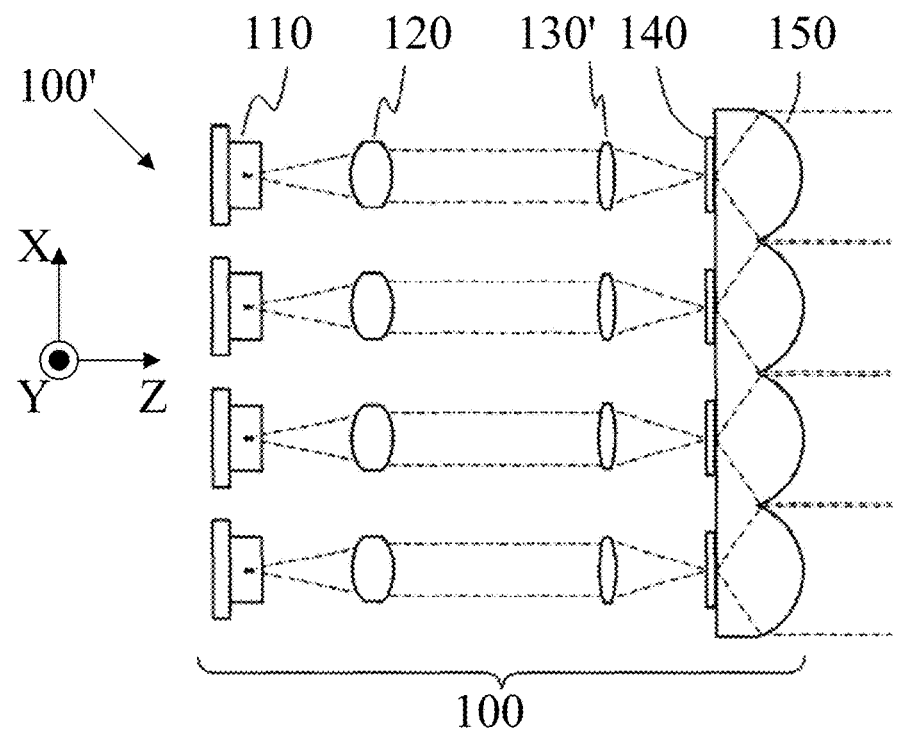
FIGS. 3A and 3B illustrate a configuration using a rotationally symmetrical convex lens for a condenser optical system in the light source apparatus.
Figure 3B:
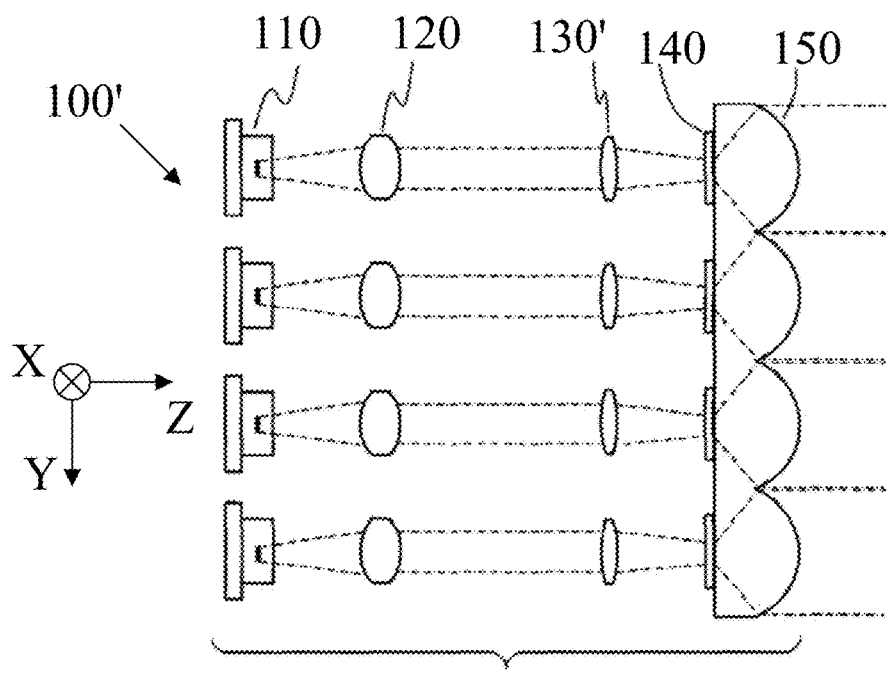

Referring to FIGS. 3A, 3B, and 4, a description will be given of a relationship between the light emitting area of the light source 110 and the beam spot shape formed on the optical characteristic conversion element 140 by the condenser optical system 130'. FIGS. 3A and 3B illustrate a light source apparatus 100' that uses a rotationally symmetrical biconvex lens (which may be a convex lens) as the condenser optical system 130'. Since the light emitting area of the light source 110 is optically conjugate with the optical characteristic conversion element 140, the (light source) image of the light emitting area is formed on the optical characteristic conversion element 140 due to the condensing action of the biconvex lens.

While it does not appear that the light source 110 is conjugate with the optical characteristic conversion element 140 in FIG. 3B, this figure is a schematic view of the light emitting area and its image shape and the optical path of the light beam is not accurate in FIG. 3B.

At this time, as illustrated in FIG. 4, a conjugate image (light source image) of the light emitting area of the light source 110 or the beam spot are formed on the optical characteristic conversion element 140. The beam spot has a shape that elongates in the Y direction similar to the light emitting area of the light source 110. In other words, the light emitting area of the light source 110 and the beam spot on the optical characteristic conversion element 140 have similar shapes (of course one of them is a reduced or magnified shape of the other shape).

The optical characteristic conversion element 140 according to this embodiment is a wavelength conversion element, such as a fluorescent body configured to convert the wavelength, and an angular conversion element, such as a diffusion member configured to convert a light beam angle. When receiving the excitation light of a specific wavelength, the fluorescent body as a representative example of the wavelength conversion element generates the emitting light different in wavelength from the incident light or provides a wavelength conversion. The wavelength conversion efficiency of this fluorescent body may lower due to the luminance saturation phenomenon. The luminance saturation is a phenomenon in which when the incident light exceeds the predetermined conversion efficiency, the heat conversion occurs or non-wavelength-converted light is emitted. In other words, even as the incident light intensity to the fluorescent body increases, the emitting fluorescent light does not increase accordingly. In addition, a powder of the fluorescent body is an inorganic material, whereas the binder used to fix the powder is an organic material and the binder is degraded by heat and light. The durability problem is inevitable as the incident light intensity increases and the binder deteriorates due to the heat and light. A device made of fluorescent body powder without the binder does not cause the durability problem but causes the luminance saturation problem.

Where the rotationally symmetrical convex lens illustrated in FIGS. 3A and 3B is used for the condenser optical system 130', the conjugate image of the light emitting area of the light source 110 is formed as the beam spot on the light characteristic conversion element 140, as illustrated in FIG. 4. The beam spot has a high light density with the elongated shape in the Y direction. Moreover, the light emitting intensity significantly scatters in the LD due to the individual difference. This luminance scattering grows worse in the light source apparatus 100' with the luminance saturation phenomenon of the fluorescent body.

In order to solve these problems, this embodiment reduces the light density of the beam spot formed on the optical characteristic conversion element 140. Hence, this embodiment uses the following configuration.

Figure 5A:
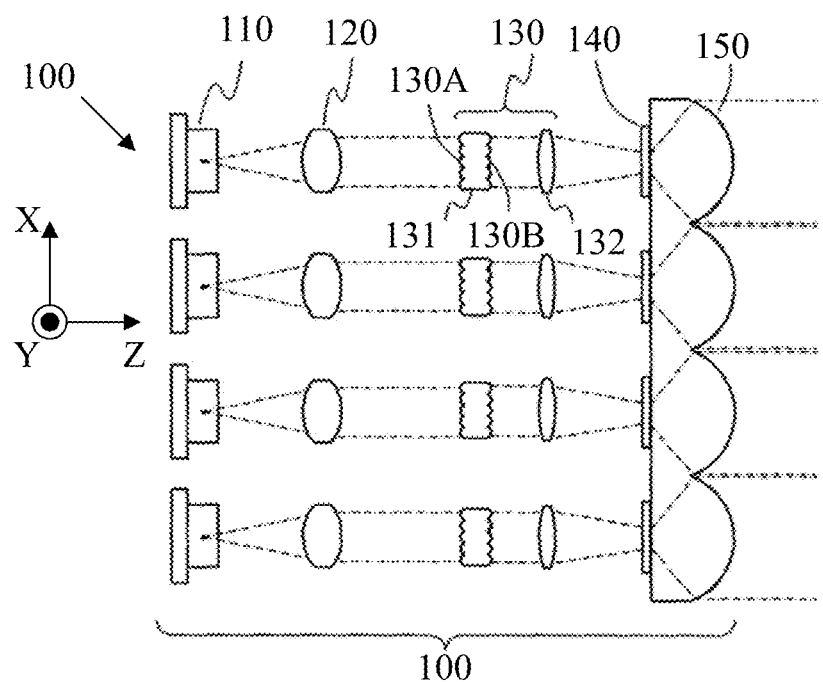
FIGS. 5A to 5C illustrate a concrete example of a condenser optical system in the light source unit according to the first embodiment.
Figure 5B:
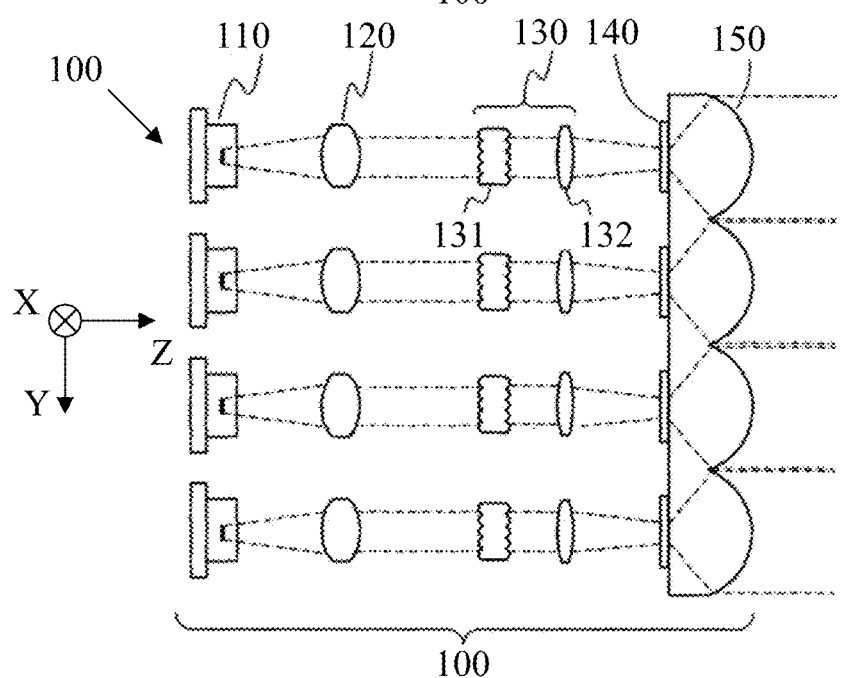

FIGS. 5A and 5B illustrate a specific structure example of the condenser optical system 130 in the light source apparatus 100 according to this embodiment illustrated in FIGS. 1A and 1B. The condenser optical system 130 which light beam collimated by the collimator lens 120 enters includes a fly-eye lens 131, and a condenser lens 132. The fly-eye lens 131 has a fly-eye lens surface (first fly-eye surface) 131A and a fly-eye lens surface (second fly-eye surface) 131B, which includes a plurality of rectangular lens cells on the light incident side and light exit side, and divides the incident light beam into a plurality of light beams. The condenser lens 132 images a plurality of light beams divided by the fly-eye lens 131 on the optical characteristic conversion element 140, and superimposes them on one another on the optical characteristic conversion element 140.

The condenser optical system 130 can form the beam spot having a uniform luminance distribution and a low light density on the optical characteristic conversion element 140, as illustrated in FIG. 6. The shape (second shape) of the beam spot has a non-similar shape to the shape (first shape) of the light emitting area of the light source 110. More specifically, the shape of the beam spot is a shape made by expanding the shape of the light emitting area of the light source 110 in at least one (which is the X direction) of two directions (X and Y directions) that are orthogonal to each other. As a result, this embodiment provides a brighter and more efficient light source apparatus that can secure a conversion characteristic (or light utilization efficiency) and durability of the optical characteristic conversion element 140 better than a case where the beam spot illustrated in FIG. 4 is formed on the optical characteristic conversion element 140.

The light incident on the optical characteristic conversion element 140 is emitted as divergent light from the optical characteristic conversion element 140 while its characteristic is converted. This divergent light (emitting light) is collimated by the capturing optical system 150 and emitted from the light source apparatus 100. The plurality of capturing optical systems 150 are arranged adjacent to each other without spaces among them (more specifically, so that their lens surfaces are adjacent to each other). This embodiment forms the plurality of condenser optical systems 130 as an integrated optical member.

This configuration eliminates spaces among the plurality of condenser optical systems 130, and the divergent light beams emitted from the fluorescent body (optical characteristic conversion element) do not enter the interface with significantly different incident angles and are less likely to provide an uneven luminance distribution. In particular, since these light beams are less defective or less uneven viewed from the front, this embodiment can provide an effect of reducing the uneven luminance on a target surface illuminated by the following illumination optical system.

In other words, the optical system (collimator) may be disposed just after the fluorescent body (optical characteristic conversion element) so that a distance from the fluorescent body approximately accords with the focal length of the optical system. The approximate accordance, as used herein, covers a range from 60% to 150% or a range from 85% to 120% of the focal length of the optical system (collimator). In this case, even when the fluorescent body and the optical system are not integrated with each other, the divergent light beam from the fluorescent body can be easily taken in and the light utilization efficiency can be easily made higher.

More specifically, the uneven luminance distribution can be more effectively reduced where the fluorescent body and the optical system are integrated with each other, and a high capturing angle is more easily available. In defining a distance between the fluorescent body and the optical system, it is necessary to define each position. Herein, the position of the optical system is a position of the surface vertex or a position most distant from the fluorescent body among refractive surfaces (curved surfaces) in the optical system (first optical system) corresponding to each fluorescent body. In addition, the position of the fluorescent body is a position of a surface of the fluorescent body on the emitting side (or the surface on the incident side or an arbitrary surface from the surface on the incident side to the surface on the emitting side).

The optical characteristic conversion element 140 and the capturing optical system 150 are arranged adjacent to each other without spaces between them. In other words, they are optically adhered to each other. This is because where the characteristic converted light emitted with a wide angular range from the optical characteristic conversion element 140 and the capturing optical system 150 are optically distant from each other, the light emitted from the optical characteristic conversion element 140 does not enter the capturing optical system 150 and is likely to cause losses. In other words, where the optical characteristic conversion element 140 and the capturing optical system 150 optically adhere to each other, the emitting light in a wide angular range can be efficiently captured and realize a high light utilization efficiency.

Figure 5C:
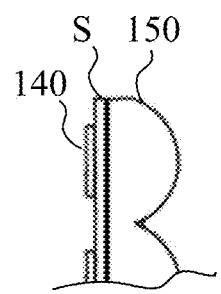

That the optical characteristic conversion element 140 and the capturing optical system 150 are optically adhered to each other (or arranged without intervening spaces) does not mean that the optical characteristic conversion element 140 and the capturing optical system 150 directly contact to each other as illustrated. For example, as illustrated in FIG. 5C, a plurality of optical characteristic conversion elements 140 may be formed on a light transmitting substrate S for holding them the surface opposite to the optical characteristic conversion element on the light transmitting substrate S and the capturing optical system 150 may directly contact each other. This configuration enables the capturing optical system 150 to efficiently capture the divergent light emitted from the optical characteristic conversion element 140.

In addition, the focal length of the capturing optical system 150 may be shorter than that of the condenser lens 132 in the condenser optical system 130. This configuration enables the diverged light emitted from the optical characteristic conversion element to be efficiently captured.

As illustrated in FIGS. 7A and 7B, the optical characteristic conversion element 140 may be held between the condenser lens 132 in the condenser optical system 130 and the capturing optical system 150. This configuration can reduce the optical interface and realize a higher light utilization efficiency. In this configuration, when the optical characteristic element 140 is a fluorescent body, a dichroic surface (film) D may be formed on the surface of the condenser lens 132 which transmits the (excitation) light with a specific wavelength from the light source 110 but reflects the fluorescent light (wavelength-converted light) different from the (excitation) light with a specific wavelength from the light source 110. Thereby, the dichroic surface D can return the fluorescent light traveling from the fluorescent body towards the light source side to the original emitting direction, and can realize a higher light utilization efficiency. The dichroic surface D may be formed on an incident surface of the condenser lens 132 or an emitting surface of the condenser lens 132, as illustrated.

This embodiment can select the emitting light from the light source apparatus 100 in accordance with a combination of the light source 110 and the optical characteristic conversion element 140. Table 1 indicates an illustrative relationship between the combination and the emitting light.

TABLE 1

| | LIGHT SOURCE 110 | OPTICAL CHARACTERISTIC CONVERSION ELEMENT 140 | EMITTING LIGHT |
|---|---|---|---|
| Ex. 1 | BLUE LD OR UV LD | FLUORESCENT BODY | FLUORESCENT WAVELENGTH (SUCH AS GREEN, YELLOW, RED) |
| Ex. 2 | RED LD, BLUE LD, GREEN LD | DIFFUSION MATERIAL (SUCH AS BARIUM SULFIDE) | RED LIGHT, BLUE LIGHT, AND GREEN LIGHT (SPECKLE NOISES PECULIAR TO LASER BEAMS ARE ELIMINATED BY DIFFUSION EFFECTS) |
| Ex. 3 | BLUE LD | FLUORESCENT BODY (EXCITATION LIGHT IS BLUE AND FLUORESCENT LIGHT IS YELLOW) | WHITE LIGHT MADE BY COMBINATION WITH UNCOVERED LIGHT (BLUE) |

Figure 8:
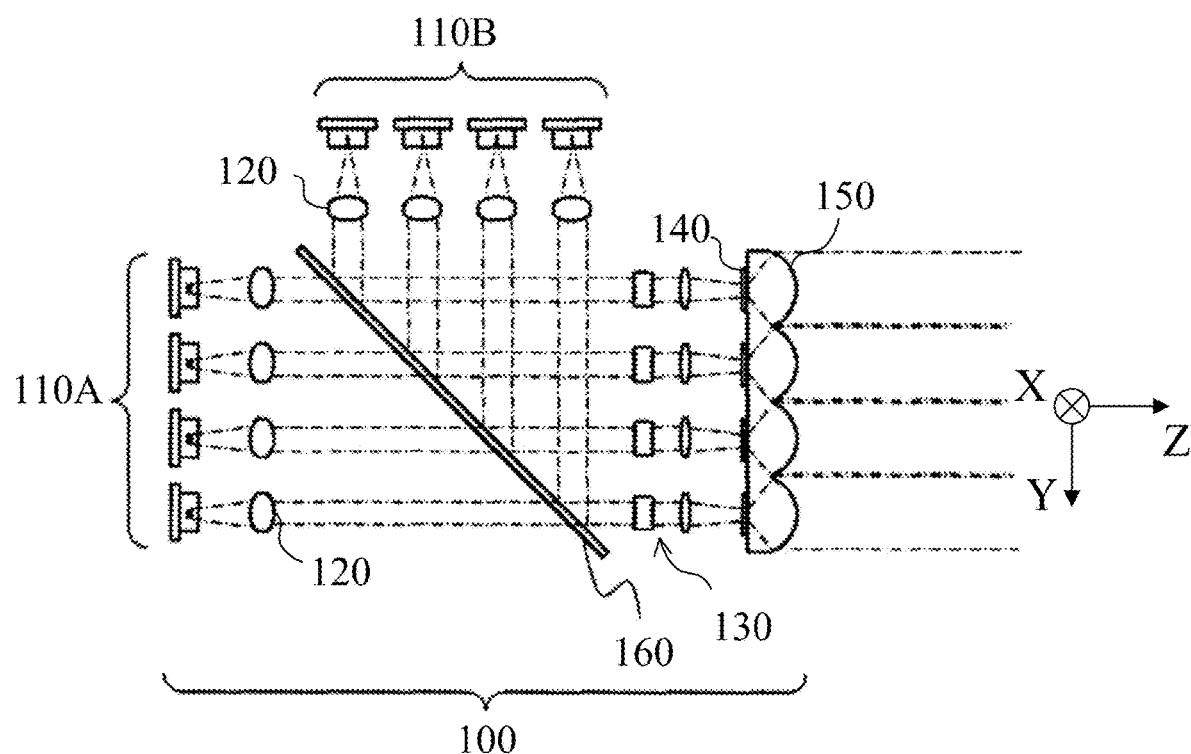
FIG. 8 illustrates another variation of the first embodiment.

FIG. 8 illustrates specific examples 1 and 3 in Table 1. Each of two light sources 110A and 110B includes a plurality of blue LDs. The optical characteristic conversion element 140 is a fluorescent body. The light source 110A emits light in the Z direction, and the light source 110B emits light in the Y direction. In general, the light emitted from the LD is linearly polarized light and thus the example in FIG. 8 arranges the light sources 110A and 110B so that the polarization directions of the linearly polarized light beams emitted the light sources 110A and 110B can be orthogonal to each other. A polarization reflection element 160 is disposed between the collimator lens 120 provided to each of the light sources 110A and 110B and the condenser optical system 130 commonly used for the light sources 110A and 110B. The polarization reflection element 160 includes a wire grid polarization plate, etc., and reflects linearly polarized light from the light source 110B and transmits the linearly polarized light from the light source 110A. Due to this configuration, the polarization reflection element 160 combines the light beam from the light source 110A and the light beam from the light source 110B with each other, and the combined light is irradiated onto the optical characteristic conversion element (fluorescent body) 140 via the condenser optical system 130. As a result, this embodiment provides a small light source apparatus that can emit brighter light.

Figure 9:
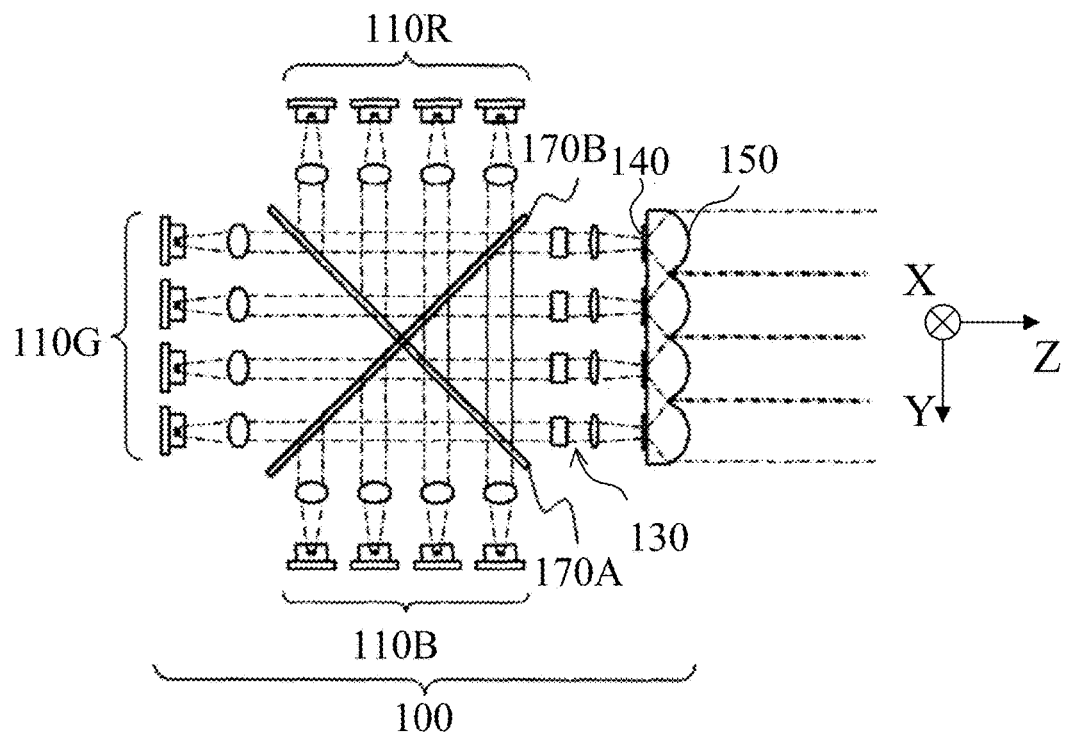
FIG. 9 illustrates still another variation of the first embodiment.

FIG. 9 illustrates a specific example 2 in Table 1. Each of three light sources 110R, 110G, and 110B includes a plurality of red LDs, green LDs, and blue LDs. Red light, green light, and blue light emitted from these light sources 110R, 110G, and 110B are combined into white light by crossed dichroic mirrors 170A and 170B, and the white light enters the light characteristic conversion element 140 as the diffusion material via the condenser optical system 130. This configuration also realizes a small light source apparatus that can emit brighter light.

While this embodiment provides the optical characteristic conversion element 140 to each light source 110, one (integrated) optical characteristic conversion element 140 may be provided to a plurality of light sources 110 and different irradiation areas on the optical characteristic conversion element 140 may receive light from the plurality of light sources 110. One light source 110 may include a plurality of light sources (LDs). This will be applied to another embodiment.

Second Embodiment

Figure 10A:
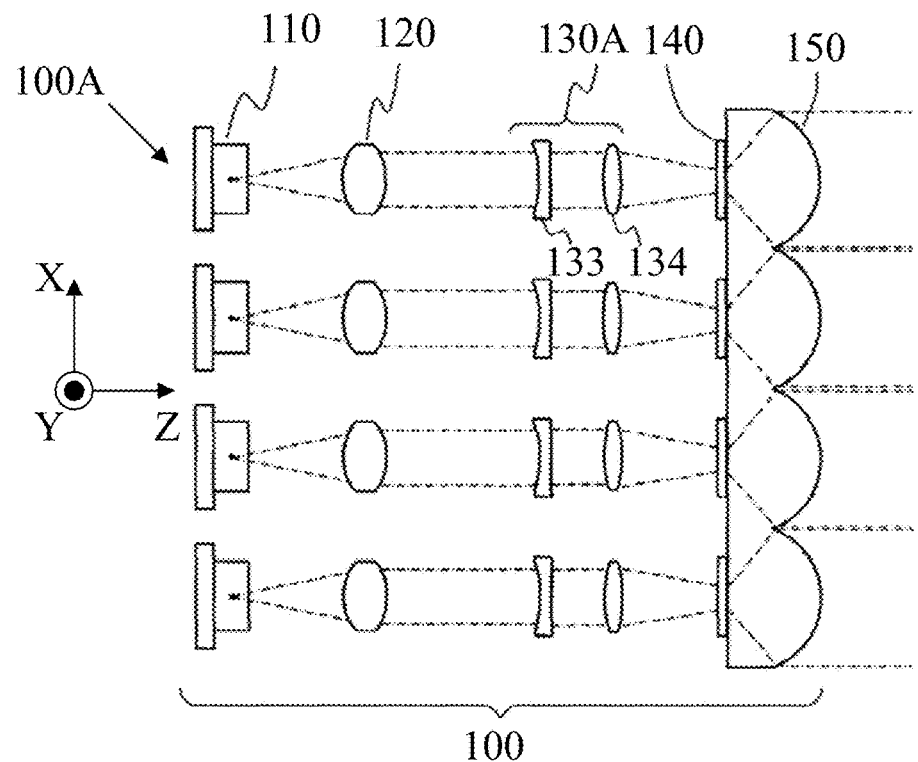
FIGS. 10A and 10B illustrate a configuration of a light source apparatus according to a second embodiment of the present invention.
Figure 10B:
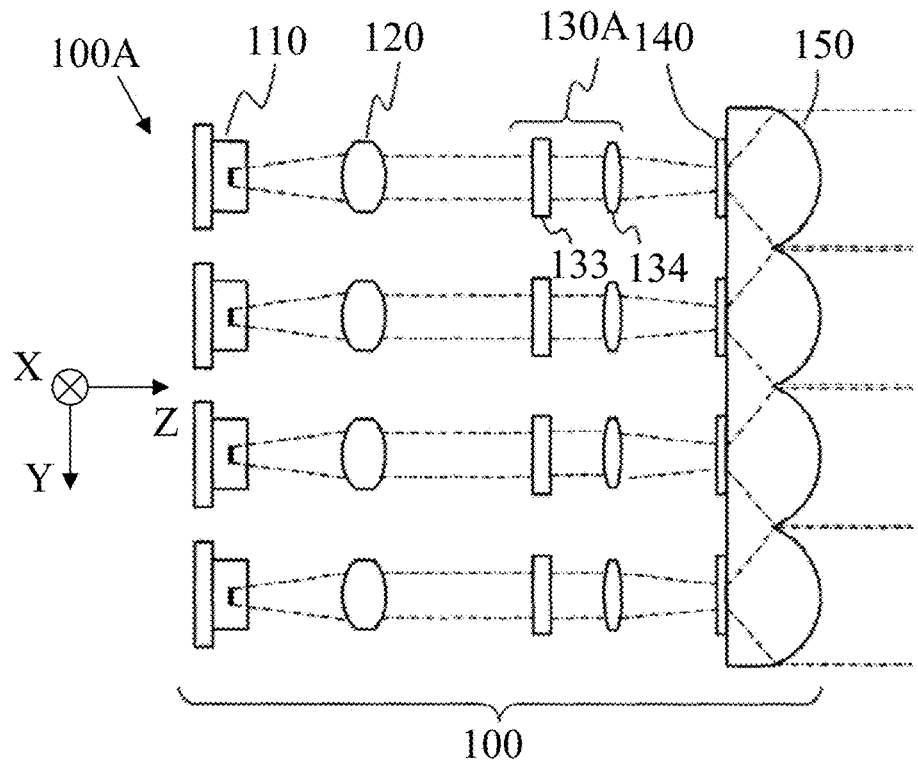

FIGS. 10A and 10B illustrate a configuration of the light source apparatus 100A according to a second embodiment of the present invention. This embodiment uses the same basic configuration as that of the first embodiment. However, the condenser optical system 130A includes a cylindrical concave lens 133 that has a refractive power only on the XZ section (or the refractive power on the XZ section is different from that on the YZ section), and a convex lens 134.

This embodiment provides a focus shift due to an effect of the cylindrical lens 133 on the XZ section having a light density higher than that on the YZ section. This configuration can reduce the light density on the XZ section, and secure the conversion efficiency and durability of the optical characteristic conversion element 140 equivalent with those in the first embodiment.

Instead of the above configuration, the condenser optical system 130A may include a toric lens in which a focal length (or a refractive power) on the XZ section is different from that on the YZ section. The cylindrical concave lens 133 may be replaced with a cylindrical convex lens, and a beam spot as a blurred image may be formed on the optical characteristic conversion element 140 by focusing light before the optical characteristic conversion element 140. In other words, the condenser optical system 130A may have different refractive powers on the XZ and YZ sections so as to provide an effect of reducing the light density of the beam spot formed on the optical characteristic conversion element 140.

Third Embodiment

Figure 11A:
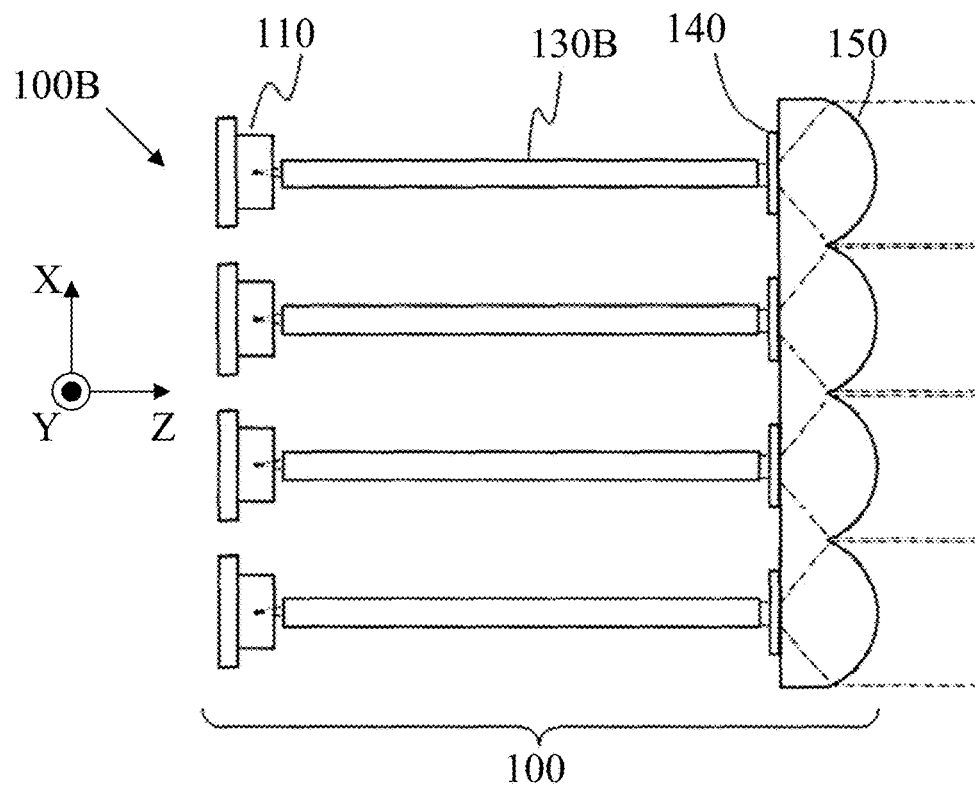
FIGS. 11A and 11B illustrate a configuration of a light source apparatus according to a third embodiment of the present invention.
Figure 11B:
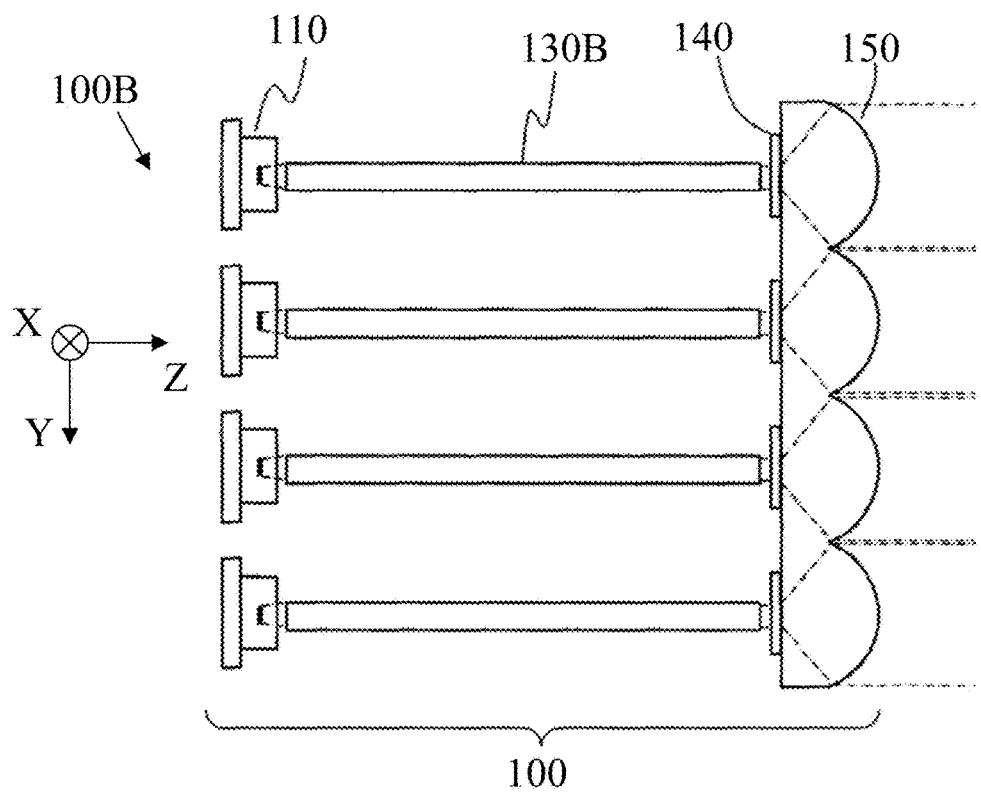

FIGS. 11A and 11B illustrate a configuration of a light source apparatus 100B according to a third embodiment of the present invention. A condenser optical system 130B in this embodiment includes a glass rod integrator.

The light emitted from the light source 110 is taken in the glass rod integrator as the condenser optical system 130B, converted into light having a uniform intensity distribution at the exit of the integrator, and irradiated onto the optical characteristic conversion element 140. This configuration can reduce the light density on the XZ section, and secure the conversion efficiency and durability of the optical characteristic conversion element 140 equivalent with those of the first embodiment.

The condenser optical system 130B may include an element referred to as a light tunnel produced by adhering a plurality of mirrors. The condenser optical system 130B may include a lens disposed on the incident or exit side of the rod integrator.

Fourth Embodiment

Figures 12A, 12B:
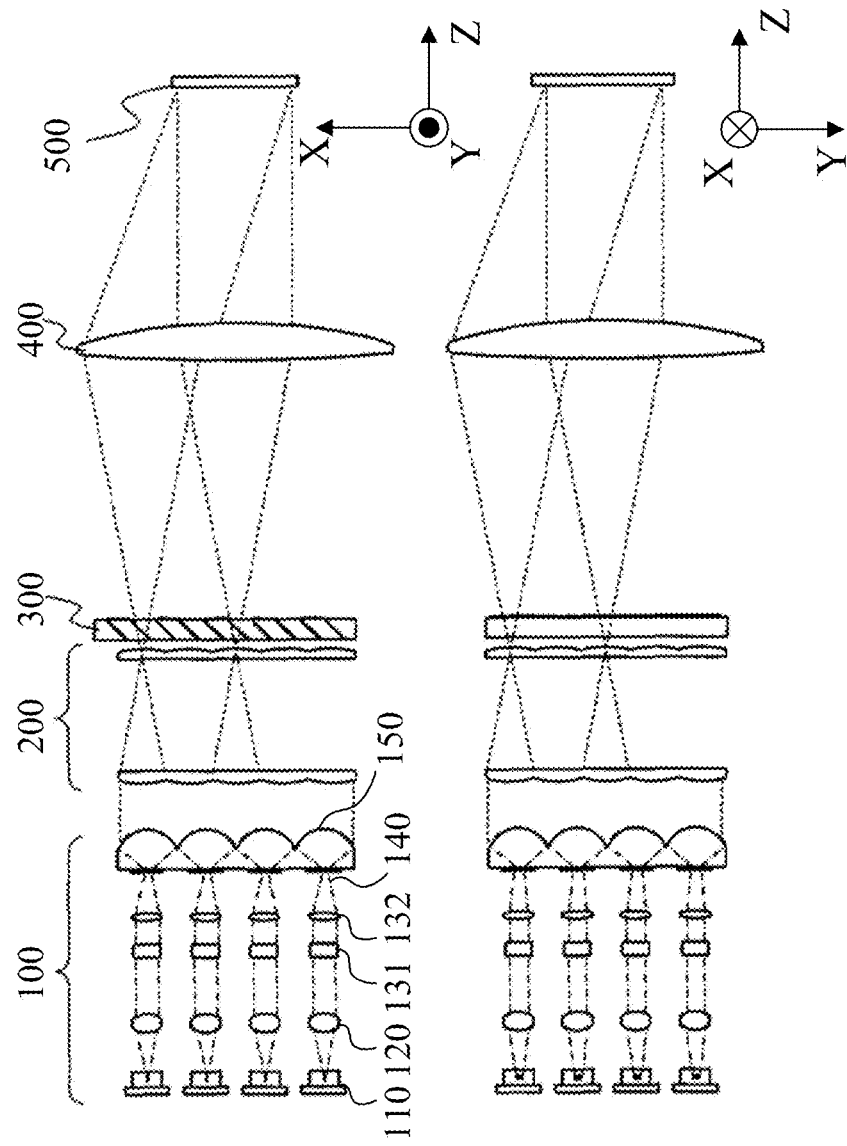
FIGS. 12A and 12B illustrate a configuration of a projector according to a fourth embodiment of the present invention.

FIGS. 12A and 12B illustrate a configuration of an image projection apparatus (projector) according to a fourth embodiment of the present invention. The projector includes the light source apparatus 100 according to the first embodiment. The light source apparatus 100 may be replaced with each of the light source apparatus 100A and 100B according to the second and third embodiments.

The light emitted from the light source apparatus 100 is condensed by the condenser lens 400 via a fly-eye lens 200 and a polarization conversion element 300 and illuminates the light modulation element 500. The fly-eye lens 200, the polarization conversion element 300, and the condenser lens 400 constitute the illumination optical system. The light modulation element 500 includes a liquid crystal display element, a digital micro mirror device, etc., and modulates incident light from the illumination optical system in accordance with the image signal.

This embodiment forms a (secondary light source) image of the beam spot formed on the optical characteristic conversion element 140 near the polarization conversion element 300. The polarization conversion element 300 correctly converts the polarization of only light that transmits the predetermined area. On the other hand, the light source apparatus 100 forms the beam spot on the optical characteristic conversion element 140, thus can efficiently form the light source image on the predetermined area on the polarization conversion element 300, and efficiently converts the polarization.

This embodiment can provide a projector that can enable specific polarized light to highly efficiently enter the light modulation element 500 and project a bright image.

Fifth Embodiment

Figure 13:
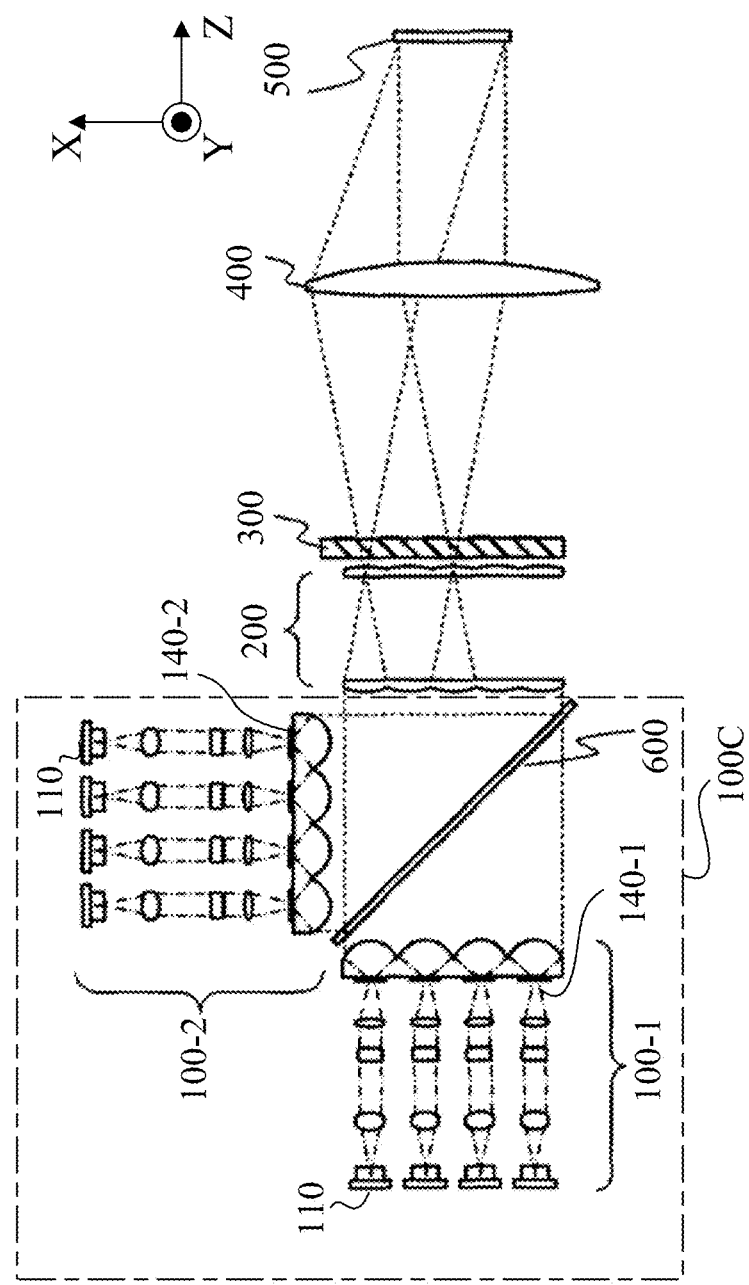
FIG. 13 illustrates a configuration of a projector according to a fifth embodiment of the present invention.

FIG. 13 illuminates a configuration of a projector according to a fifth embodiment of the present invention. This embodiment uses the same basic configuration as that of the fourth embodiment. However, this embodiment includes two light source apparatuses 100-1 and 100-2 described in the first embodiment for the light source apparatus 100C. The light source apparatuses 100-1 and 100-2 may be replaced with the light source apparatuses 100A and 100B according to the second and third embodiments.

The light source apparatus 100-1 uses the blue LD for the light source 110, blue light as excitation light for the optical characteristic conversion element 140-1, and a yellow fluorescent body that emits yellow light as fluorescent light. On the other hand, the light source apparatus 100-2 uses the blue LD for the light source 110, and a diffusion material for the optical characteristic conversion element 140-2, and emits blue light as diffusion light. The yellow light from the light source apparatus 100-1 and the blue light from the light source apparatus 100-2 are combined by a dichroic mirror 600 as a light combining element, and guided as white light to the illumination optical system (200, 300, 400), illuminating the light modulation element 500.

This embodiment can provide a projector that can highly efficiently generate white light and project a bright image.

Sixth Embodiment

FIGS. 14A and 14B illustrate a configuration of a projector according to a sixth embodiment of the present invention. This embodiment also uses the light source apparatus 100 according to the first embodiment, but an imaging relationship of the light source image is different from that in the fourth and fifth embodiments. In the fourth and fifth embodiments, the image of the beam spot formed on the optical characteristic conversion element 140 is imaged near the polarization conversion element 400 by the fly-eye lens 200.

On the other hand, this embodiment provides a critical illumination in which the image of the beam spot formed on the optical characteristic conversion element 140 is directly formed on the light modulation element 500. In other words, the capturing optical system 150 and a condenser lens 700 make optically conjugate the optical characteristic conversion element 140 and the light modulation element 500 with each other. The condenser lens 700 converges light from each of the plurality of optical characteristic conversion elements 140 and superimposes (secondary light source) images of the plurality of beam spots formed by these light beams, on the light modulation element 500.

In the critical illumination, the uneven luminance of the light source may cause an uneven luminance distribution on the illuminated surface, but this embodiment superimposes and uniformizes a multiplicity of light source images and thus eliminates the uneven luminance distribution.

FIG. 15 illuminates a light emitting area of the light source 110 according to this embodiment, a light source image on an exit-side fly-eye lens surface 131B of the fly-eye lens 131, a beam spot on the optical characteristic conversion element 140, and an irradiated area for the light modulation element 150. The light emitting area of the light source 110 has a shape that elongates in the Y direction.

In this embodiment, the beam spot on the optical characteristic conversion element 140 is optically conjugate with the light modulation element 500, and thus the illumination area needs to have a rectangular shape with the same aspect ratio as that of the light modulation element 500. In other words, each lens cell in the flu-eye lens surfaces 131A and 131B of the fly-eye lens 131 in the condenser optical system 130 conjugate with the optical characteristic conversion element 140 may have the same aspect ratio as that of the light modulation element 500.

Since the light source image as an image of the light emitting area of the light source 110 is formed on the lens cell LC in the exit-side fly-eye lens surface 131B, the aspect ratio of the lens cell LC is set so that its longitudinal direction accords with the longitudinal direction of the light emitting area on the light source 110.

This relationship is applicable when a rod integrator is replaced with the fly-eye lens 131.

Seventh Embodiment

Figure 16A:
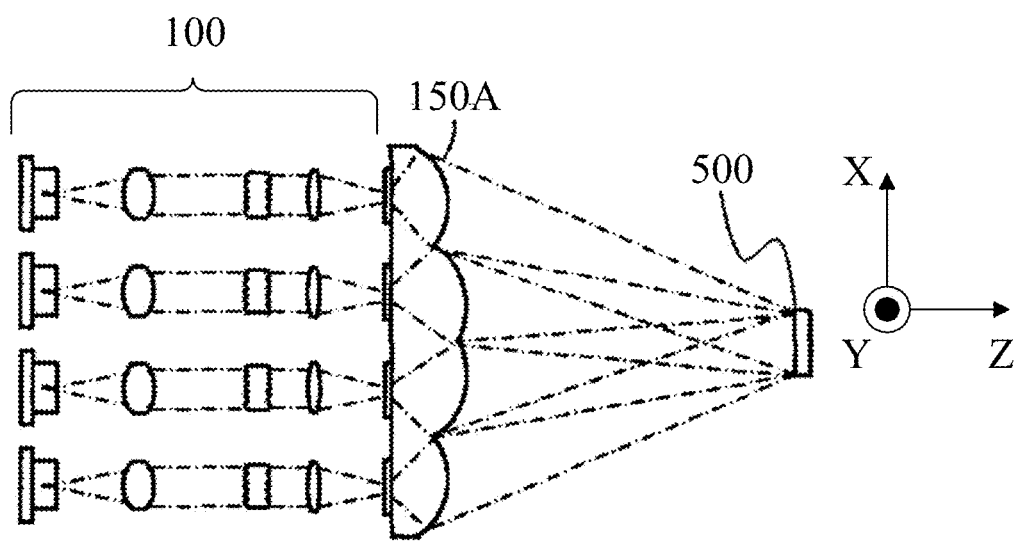
FIGS. 16A and 16B illustrate a configuration of a light source apparatus according to a seventh embodiment of the present invention.
Figure 16B:
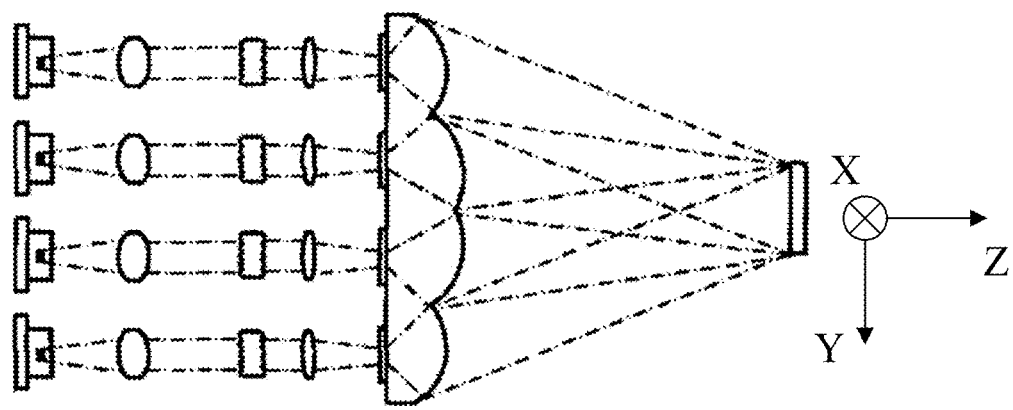

FIGS. 16A and 16B illustrate a configuration of a projector according to a seventh embodiment of the present invention. This embodiment uses the same basic configuration as that of the sixth embodiment. However, instead of the condenser lens 700 used in the sixth embodiment, this embodiment provides the convergence and superimposition of light from each of a plurality of optical characteristic conversion element 140 by decentering at least part of a plurality of capturing optical systems 150A.

This embodiment uses fewer working optical members than that of the sixth embodiment.

Eighth Embodiment

Figure 17:
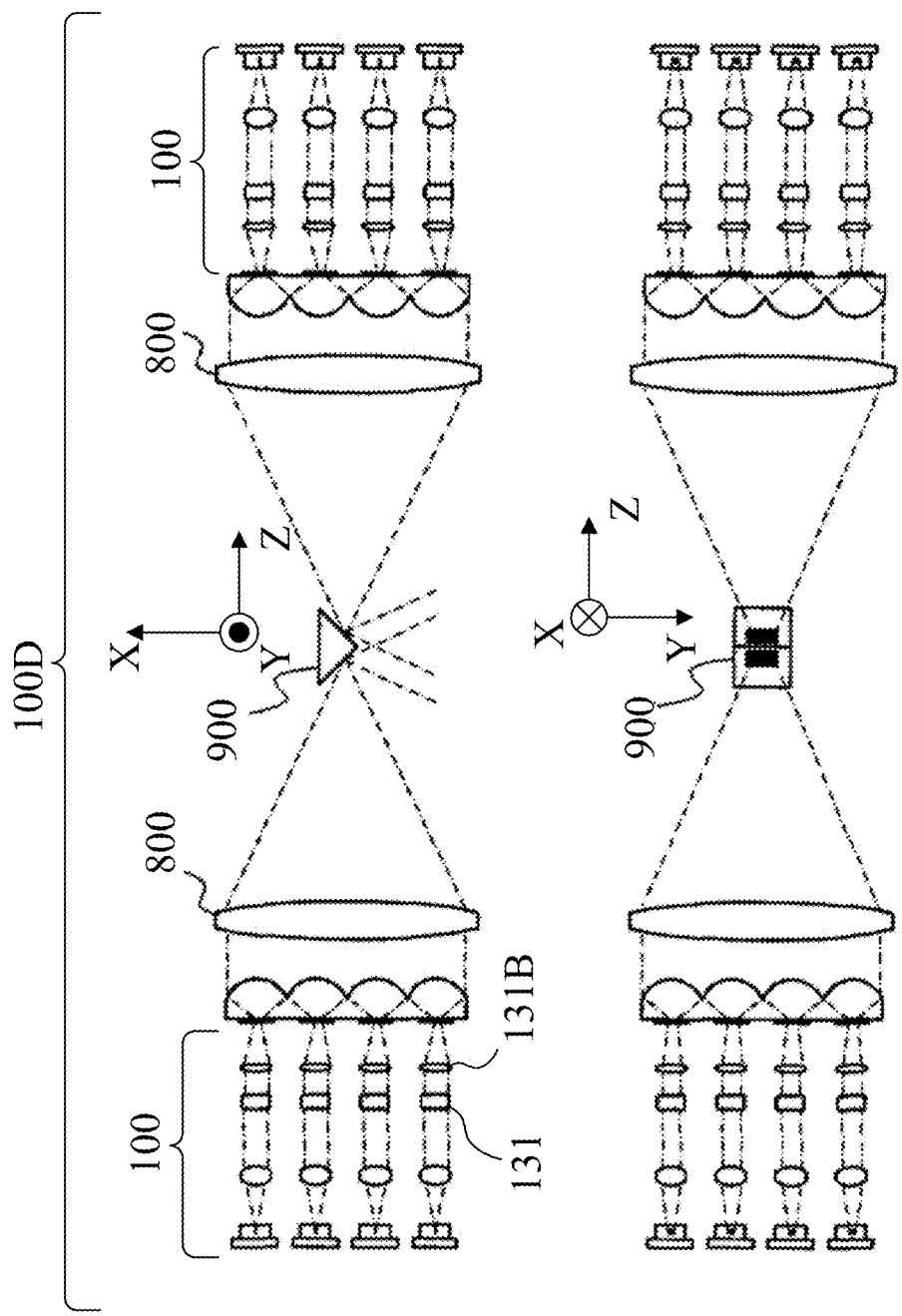
FIG. 17 illustrates a configuration of the light source apparatus according to an eighth of the present invention.

FIGS. 17A and 17B illustrate a partial configuration of a light source apparatuses 100D in a projector according to an eighth embodiment of the present invention. The light source apparatus 100D combines light beams emitted from two light source apparatuses 100 through a combining prism 900 as a combining optical system and guides the combined light to an unillustrated illumination optical system. The light source apparatus 100 may be replaced with each of the light source apparatus 100A and 100B according to the second and third embodiment.

Each light beam emitted from each of the two light source apparatuses 100 is condensed by a convex lens 800, and focuses on the combining prism 900. The combining prism 900 has two reflective surfaces. The light beam emitted from one light source apparatus 100 forms a beam spot on one reflective surface and the light beam emitted from the other light source apparatus 100 forms a beam spot on the other reflective surface. The light beams emitted from the two light source apparatuses 100 are reflected and combined by the combining prism 900 and guided to the illumination optical system. This configuration can combine light beams from the two light source apparatuses 100 irrespective of the polarization directions and wavelengths of these light beams.

Figure 18:
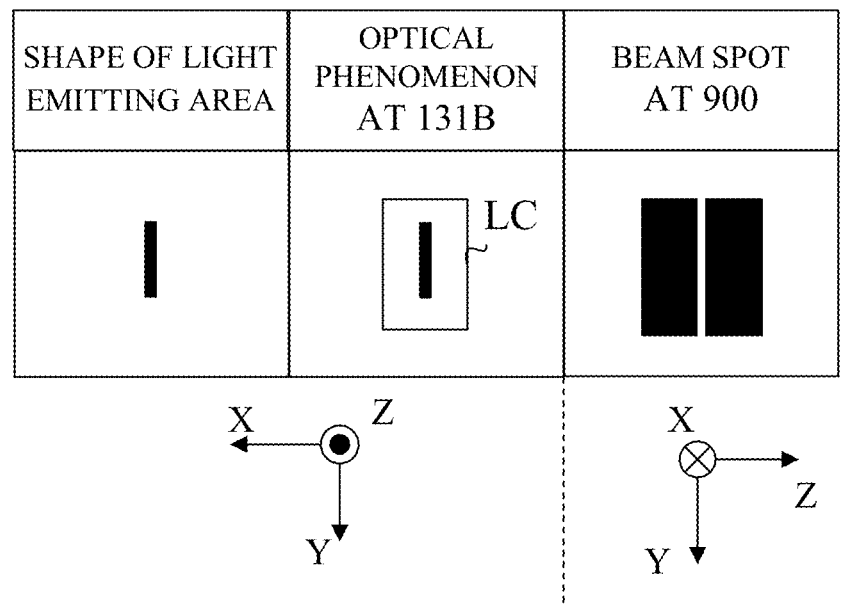
FIG. 18 illustrates a relationship between a light source image and a light conversion element according to the eighth embodiment of the present invention.

Even in this embodiment, as illustrated in FIG. 18, each of the light emitting area of the light source 110 and the light source image formed on the exit-side fly-eye lens surface 131B of the fly-eye lens 131 has a shape that elongates in the Y direction. On the other hand, the beam spot formed on the reflective surface of the combining prism 900 has a rectangular shape that is made by expanding the light emitting area and the light source image in the Y and X directions (or Z direction when viewed from the X direction). The beam spot formed on the reflective surface of the combining prism 900 is longer in the Y direction than in the X direction (Z direction). This shape relationship enables the light beams from the two light source apparatuses 100 to be combined without lowering the brightness.

Two beam spots as light source images on the optical characteristic conversion element 140 in the two light source apparatuses 100 are formed on the two reflective surfaces on the combining prism 900. When the shape of each beam spot in the Y direction is made longer than that in the X direction (Z direction), the two beam spots form an approximately square combined light spot. As a result, the illumination optical system can take the combined light from the combining prism 900 with a few losses.

In addition, similar to the shapes of the light emitting area of the light source 110 and the light source image of the fly-eye lens surface 131B, the lens cell LC of the fly-eye lens surfaces 131A and 131B on the incident and exit sides of the fly-eye lens 131 in the Y direction is longer than in the X direction. This configuration can provide a higher light utilization efficiency.

Ninth Embodiment

Figure 19:
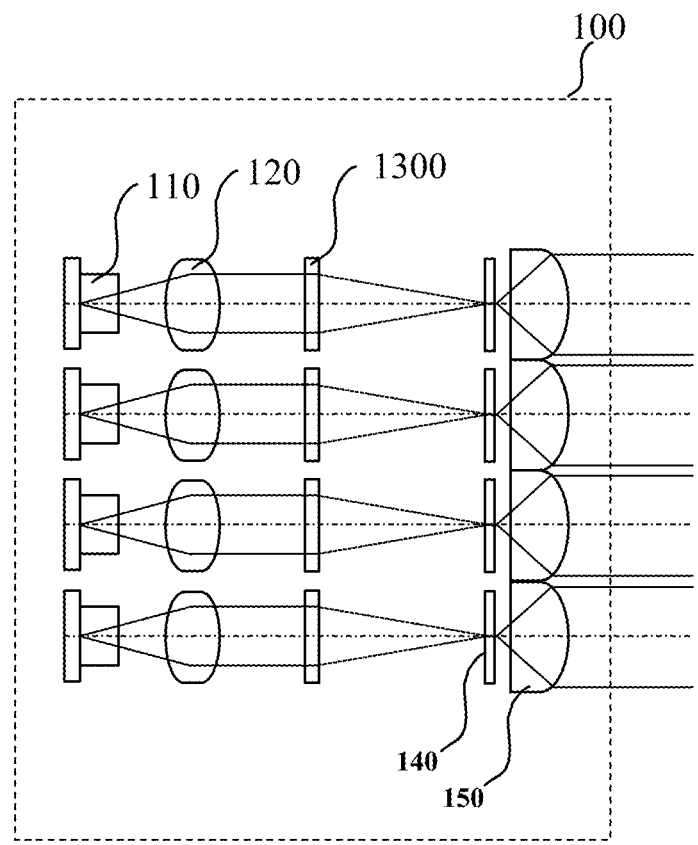
FIG. 19 illustrates a configuration of the light source apparatus according to a ninth embodiment of the present invention.
Figure 20:
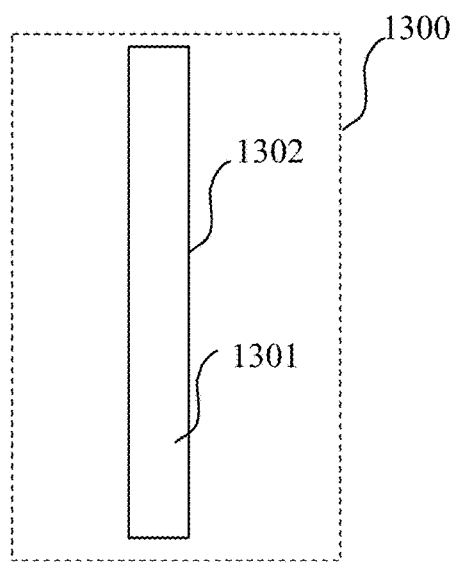
FIG. 20 illustrates a configuration of a hologram element 1300.

FIG. 19 illustrates a configuration of a light source apparatus 100 according to a ninth embodiment of the present invention. In this embodiment, the condenser optical system (first optical system) 130 includes a hologram element 1300. The hologram element 1300 includes a microstructural surface 1302 on a surface of a substrate 1301, as illustrated in FIG. 20.

Figure 21:
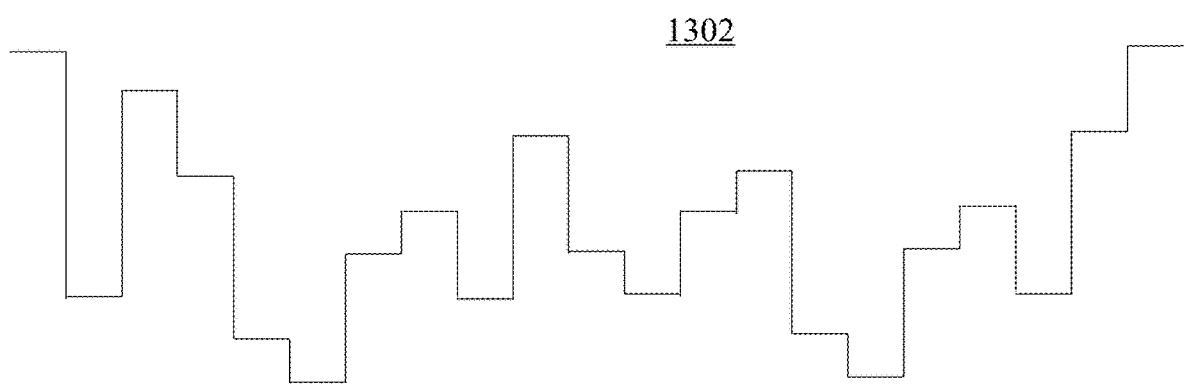
FIG. 21 schematically illustrates a microstructural surface 1302.

FIG. 21 schematically illustrates the microstructural surface 1302. The substrate 1301 is a quartz substrate in this embodiment, and the microstructural surface 1302 is formed on its surface. The microstructural surface 1302 can be formed by a technology, such as etching and nanoimprinting, and this embodiment forms multiple exposure with etching. More exposures can create a complicated shape and improve the diffraction efficiency. This embodiment forms eight-phase microstructure through three exposures.

The light incident on the hologram element 1300 is diffracted on the microstructural surface 1302 of the hologram element 1300, and makes a desired distribution on the optical characteristic conversion element 140. FIG. 22A illustrates an intensity distribution of the microstructural surface 1302 of the hologram element 1300, and FIG. 22B illustrates an intensity distribution of the optical characteristic conversion element 140. As illustrated in FIG. 22B, this embodiment also can make non-similar the shape of the irradiation area to the shape of the light emitting area.

Since the hologram element 1300 can realize a flat intensity distribution with a desired size, this embodiment can reduce the light density and secure the conversion efficiency and the durability. Of course, an arbitrary pattern, such as a rectangular distribution and a circular distribution, can be formed by changing the microstructure pattern. A lens may be disposed between the hologram element and an optical characteristic conversion element.

Variation of this Embodiment

Referring to FIGS. 23 to 27, a description will be given of a variation of this embodiment.

Figure 23:
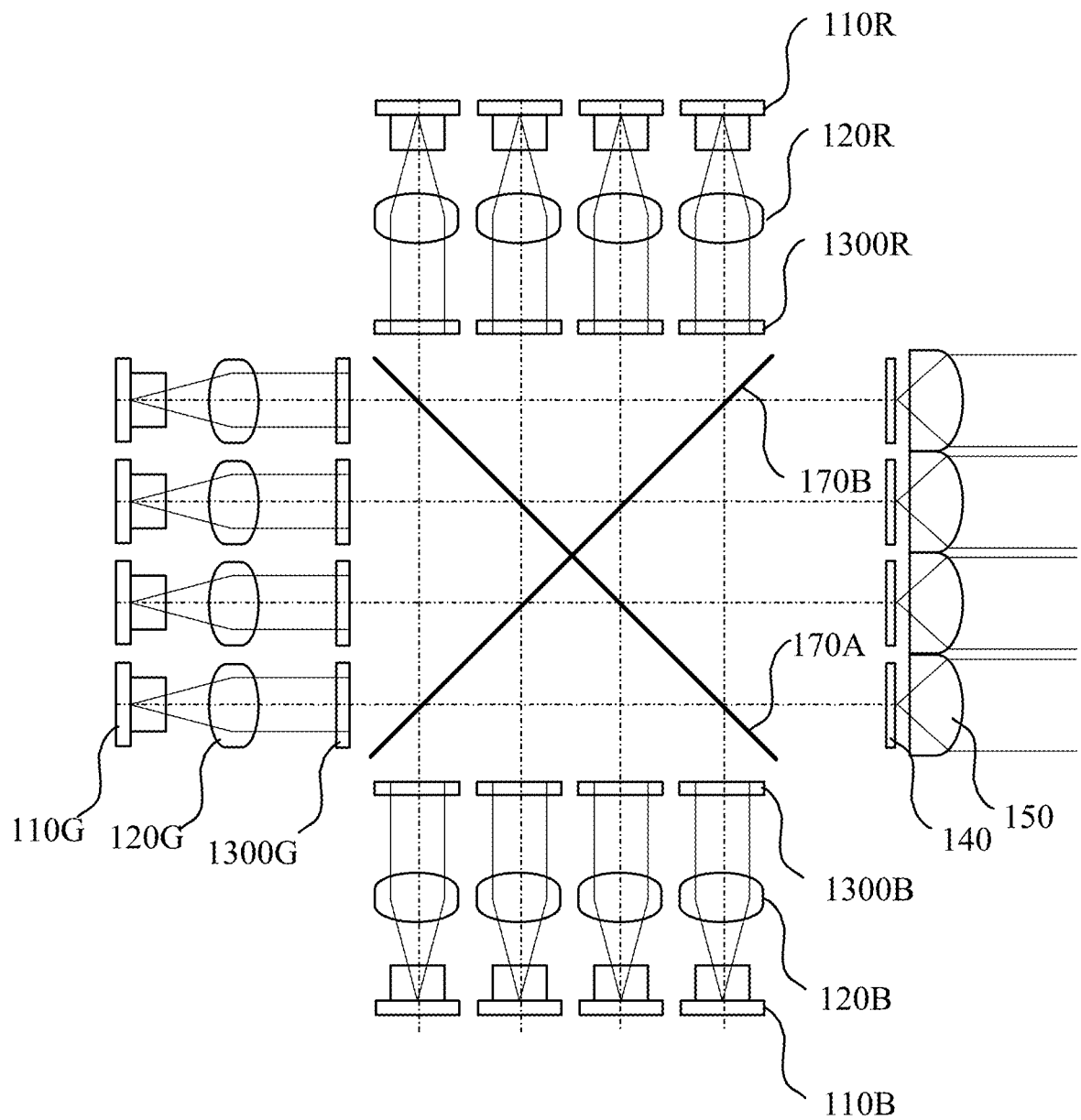
FIG. 23 illustrates a first variation of the ninth embodiment.

While the light source apparatus illustrated in FIG. 19 uses the fluorescent body as the optical characteristic conversion element, this variation illustrated in FIG. 23 uses a diffusion plate for the optical characteristic conversion element 140, which diffuses incident light or converts a traveling direction of the incident light. In addition, the variation illustrated in FIG. 23 provides a red light source 110R, a green light source 110G, and a blue light source 110B in order to generate white light without the fluorescent body. Each colored light source is a laser diode or LED configured to emit corresponding colored light. Colored light beams from these colored light sources are combined with one another by the dichroic mirrors 170A and 170B via the collimator lenses 120R, 120G, and 120B and the hologram elements 1300R, 1300G, and 1300B, and the combined light enters the capturing optical system 150 via the diffusion plate 140.

Figure 24:
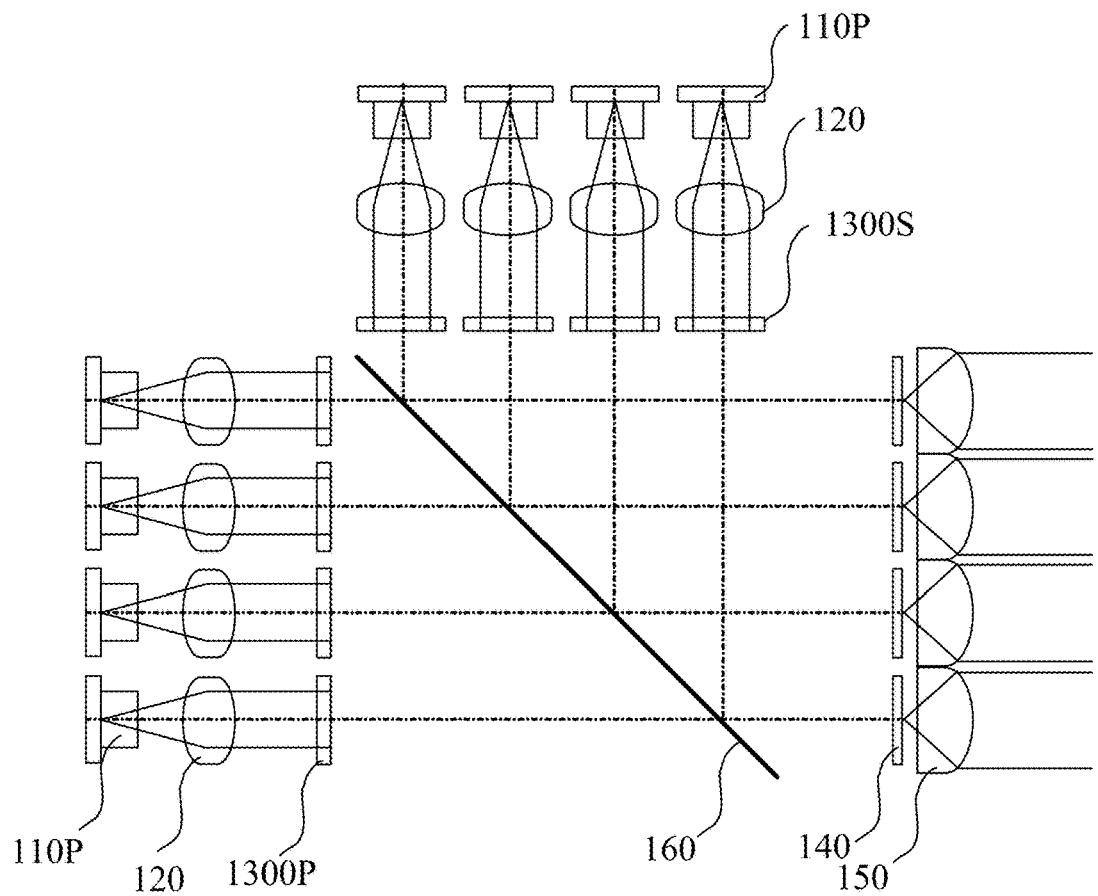
FIG. 24 illustrates a second variation of the ninth embodiment.

The variation illustrated in FIG. 24 combines, through the polarization beam splitter 160, a light beam from the light source 110P configured to emit blue P-polarized light and a light beam from the light source 110S configured to emit blue S-polarized light, and guides the combined light to the optical characteristic conversion element 140. In this embodiment, the optical characteristic conversion element 140 is a yellow fluorescent body. A collimator lens and a corresponding one of hologram elements 1300P and 1300S are provided in the traveling direction of each light source. The hologram element 1300S may be the hologram element 1300P rotated by 90°.

Figure 25:
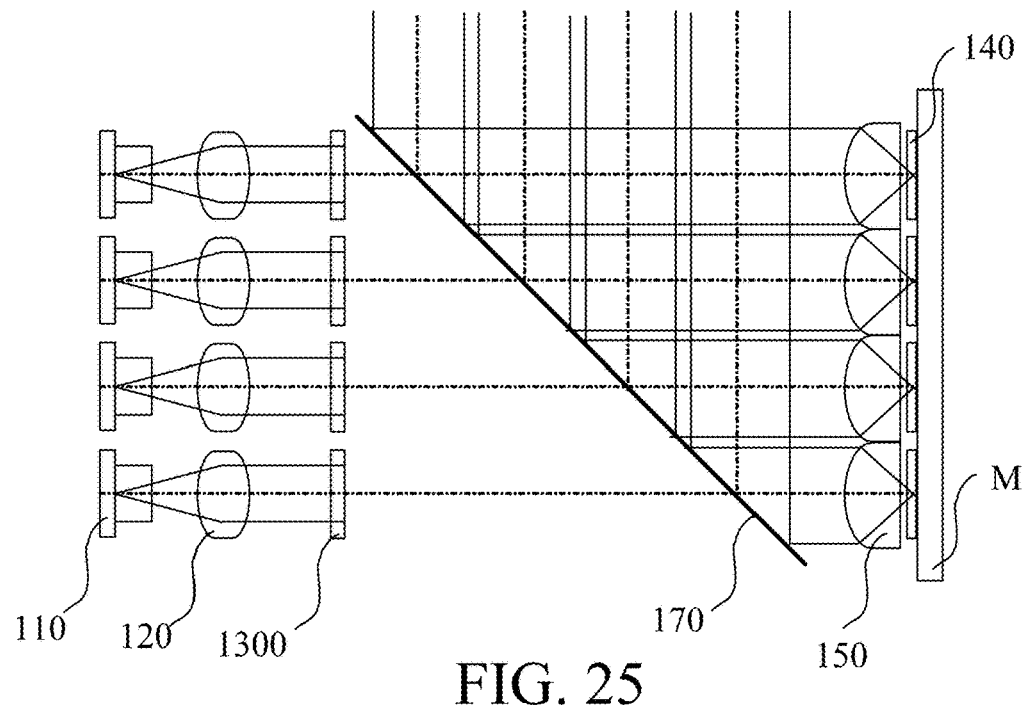
FIG. 25 illustrates a third variation of the ninth embodiment.

The variation illustrated in FIG. 25 provides the optical characteristic conversion element 140 as the fluorescent body on a mirror M. The blue light from the light source 110 illustrated in FIG. 19, the collimator lens 120, and the hologram element 1300 transmits a dichroic mirror 170, and is guided to the optical characteristic conversion element 140 via the capturing optical system 150. The fluorescent light (yellow) that has transmitted the optical characteristic conversion element 140, been reflected on the mirror M, and returned to the dichroic mirror 170 is reflected on the system dichroic mirror 170 and guided to the subsequent system. Although not illustrated in FIG. 25, a blue light source may be provided separate from the light source 110 so that the blue light can transmit through the dichroic mirror 170 and be guided to the subsequent system.

Figure 26:
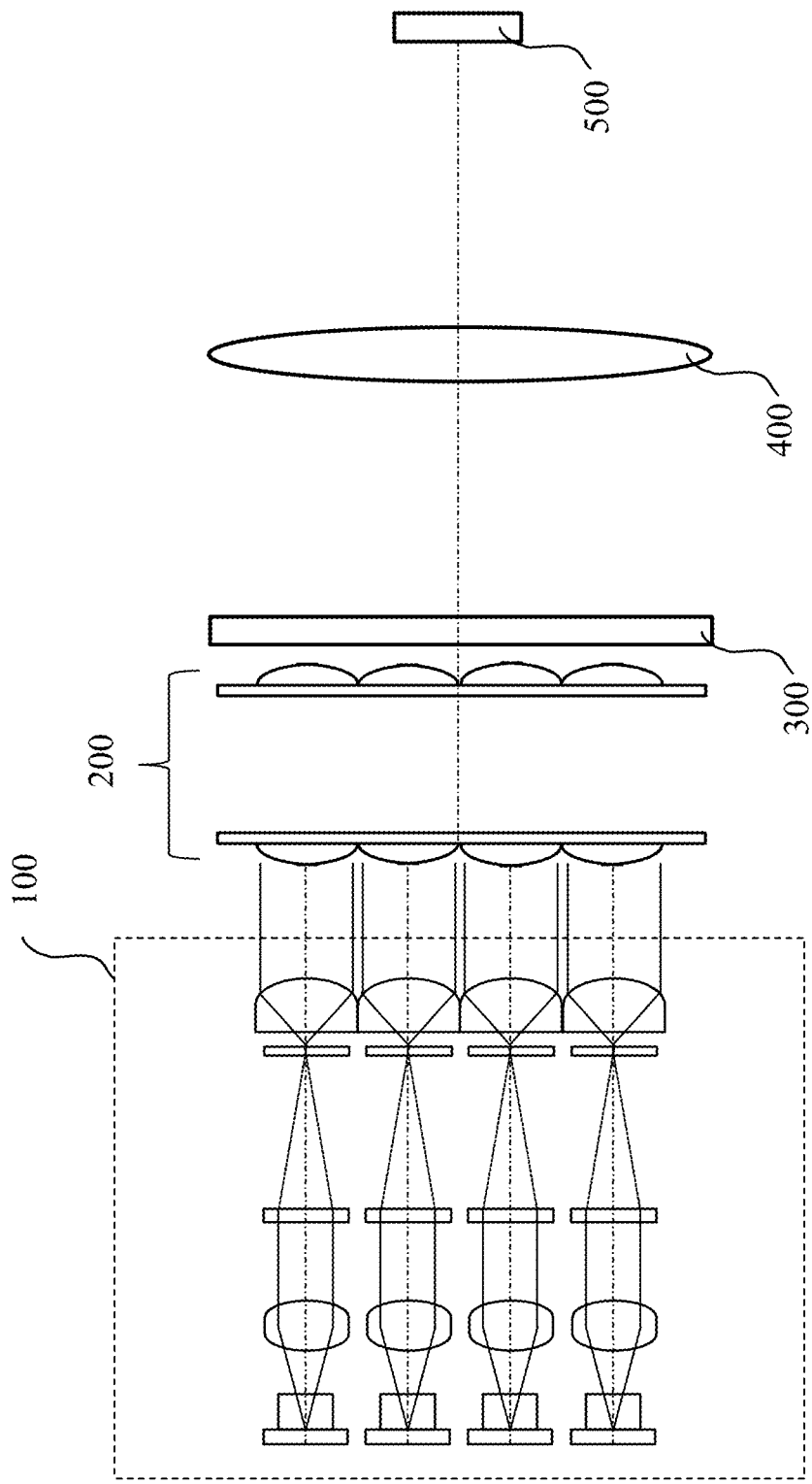
FIG. 26 illustrates a fourth variation of the ninth embodiment.
Figure 27:
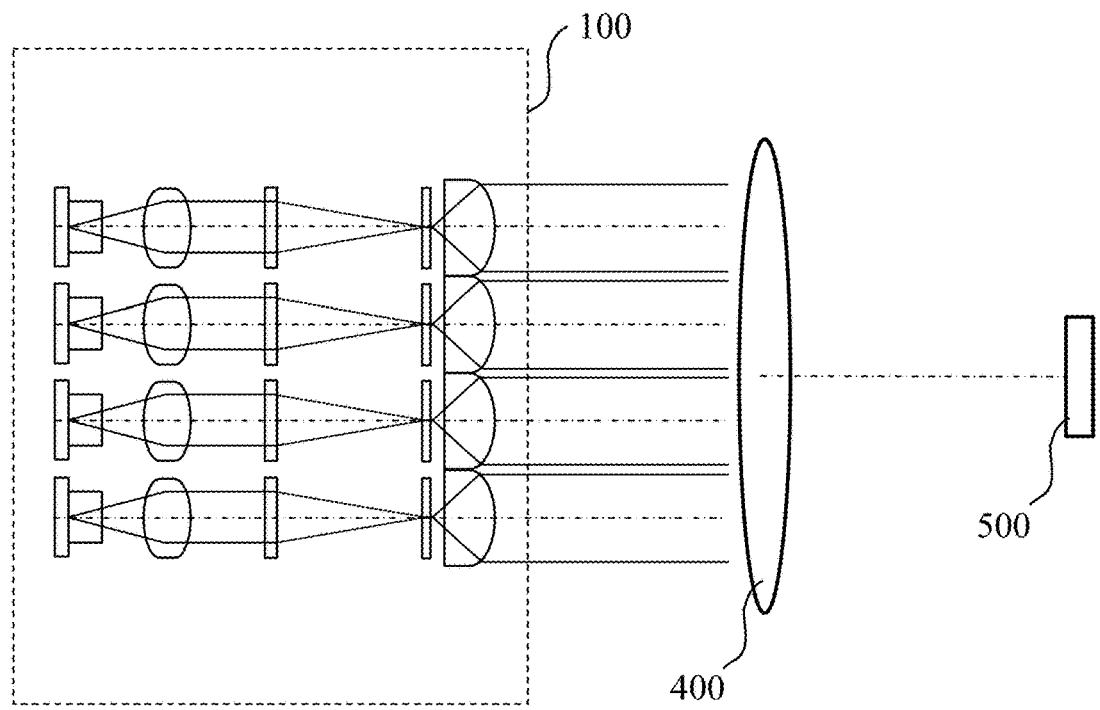
FIG. 27 illustrates a fifth variation of the ninth embodiment.

The light source apparatus 100 illustrated in FIG. 19 may use a light source apparatus for the illumination optical system for a Koehler illumination illustrated in FIG. 26, or a light source apparatus for the illumination optical system for a critical illumination illustrated in FIG. 27.

Tenth Embodiment

Figure 28:
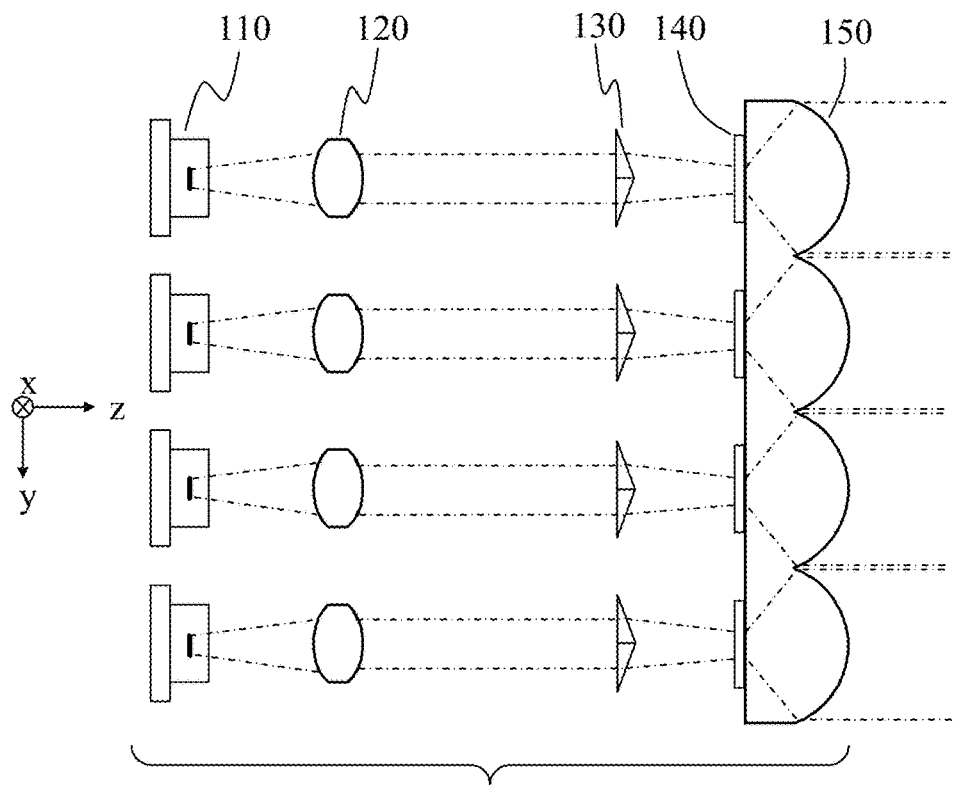
FIG. 28 illustrates a configuration of a light source apparatus according to a tenth embodiment of the present invention.
Figure 29A:
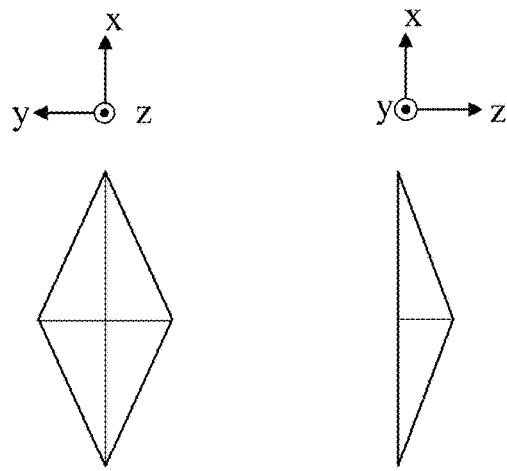
FIGS. 29A to 29D illustrate a configuration and a function of a glass member 130.
Figure 29B:
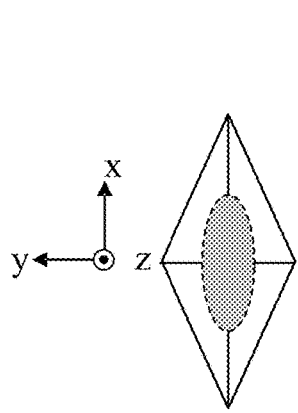
Figure 29C:
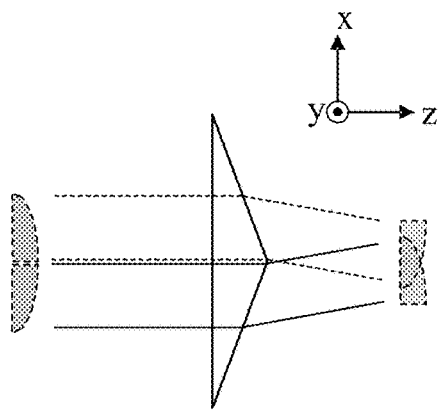
Figure 29D:
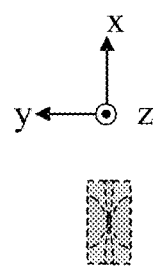

Referring to FIGS. 28 and 29A-29D, a description will be given of a configuration of a light source apparatus 100 according to a tenth embodiment of the present invention. A difference between the ninth embodiment and this embodiment is that this embodiment replaces the hologram element with a glass member (prism) having a quadrangular pyramid shape for the first optical system 130, as illustrated in FIG. 28. The glass member 130 is disposed so that its vertex faces the optical characteristic conversion element 140, as illustrated in FIGS. 28 and 29A. As illustrated in FIG. 29B, the light incident on the glass member 130 is divided into four light beams, as illustrated in FIGS. 29C and 29D, is superimposed on one another, and forms an approximately rectangular distribution. This configuration can also make non-similar the shape of the irradiation area to the shape of the light emitting area.

As illustrated in FIG. 28, a plurality of glass members 130 may be provided or a plurality of glass members 130 may be arranged on a single transparent substrate.

Each of the above embodiments is merely illustrative, and a variety of variations and modifications of each embodiment of the present invention may be made. For example, a plurality of first optical systems 130 may be replaced with a plurality of microstructural surfaces on a single substrate or a single first optical system 130. In addition, instead of a plurality of capturing optical systems 150, for example, a lens system having a lens with a large diameter may capture light.

According to each embodiment, the first light source apparatus can restrain the conversion efficiency of the optical characteristic conversion element from lowering and the optical characteristic conversion element from deteriorating, and stably generate bright light. In addition, the second light source apparatus can improve the utilization efficiency of the light emitted from the optical characteristic conversion element and generate bright light. Moreover, the third light source apparatus can improve the utilization efficiency of the emitting light. The image projection apparatus using these light source apparatuses can project a bright and high-quality image.

In this specification, the optical characteristic converter can include a plurality of optical characteristic conversion elements or an integrated optical characteristic conversion element. The first optical system includes one or more a plurality of optical elements. Each optical element may be considered to be a first optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-254570, filed on Dec. 28, 2016, and 2017-226959, filed on Nov. 27, 2017, which are hereby incorporated by reference herein in their entirety.

What is claimed is:

1. A light source apparatus comprising:
a plurality of light sources each having a light emitting area;
an optical characteristic conversion element including a wavelength conversion element or an angular conversion element and configured to convert incident lights from the light sources into emitting lights each having a wavelength or a diffusion angle different from that of the incident light;
a plurality of collimator lenses each provided for each light source and each configured to collimate a divergent light emitted from each light source; and
a first optical system configured to irradiate the incident lights on the optical characteristic conversion element,
wherein the first optical system is configured to convert a shape of the collimated light from each collimator lens into a shape non-similar to that of the light emitting area and to irradiate the shape-converted collimated lights as the incident lights to a plurality of irradiated areas on the optical characteristic conversion element, each irradiated area corresponding to each light source,
wherein the first optical system includes:
a fly-eye lens which the collimated light from each collimator lens enters and which divides the collimated light into a plurality of light beams, and
a plurality of condenser lenses which superimpose the plurality of light beams on one another and which irradiate the superimposed light beams as incident lights on the plurality of irradiated areas on the optical characteristic conversion element, and
wherein each condenser lens of the plurality of condenser lenses corresponds to each light source of the plurality of light sources, respectively.

2. The light source apparatus according to claim 1, wherein the shape of the irradiated area corresponds to a shape made by expanding the shape of the light emitting area in at least one of two directions that are orthogonal to each other.

3. The light source apparatus according to claim 1, wherein the first fly-eye lens includes, in order from a light source side, a first fly-eye surface and a second fly-eye surface.

4. The light source apparatus according to claim 1, further comprising a light combining element including a polarization reflection element or a dichroic mirror and being disposed between the collimator lenses and the first optical system and configured to combine the collimated lights from the collimator lenses with another light by reflection and transmission to introduce combined lights into the first optical system.

5. The light source apparatus according to claim 1, further comprising a second optical system configured to collimate the emitting lights as divergent lights,
  wherein the optical characteristic conversion element and the second optical system are arranged without an intervening space therebetween.

6. The light source apparatus according to claim 1, further comprising a second optical system including second optical elements each configured to collimate the emitting light as a divergent light,
  wherein the second optical elements are arranged without an intervening space therebetween.

7. The light source apparatus according to claim 1, further comprising a second optical system configured to collimate the emitting lights as divergent lights,
  wherein a focal length of the second optical system is shorter than that of the first optical system.

8. The light source apparatus according to claim 1, wherein the optical characteristic conversion element includes a plurality of optical characteristic conversion elements.

9. The light source apparatus according to claim 1, wherein the optical characteristic conversion element includes an integrated optical characteristic conversion element.

10. The light source apparatus according to claim 1, further comprising a dichroic surface disposed closer to the plurality of light sources than the optical characteristic conversion element, and configured to transmit the incident light and to reflect the wavelength-converted light.

11. The light source apparatus according to claim 1, wherein the first optical system includes first optical elements provided for the respective incident lights and forming the respective irradiated areas on the optical characteristic conversion element.

12. The light source apparatus according to claim 1, wherein the first optical system is configured to convert the shape of the collimated light from each collimator lens such that an aspect ratio of a luminance distribution formed in each irradiated area becomes 1 and to irradiate the shape-converted collimated light as the incident light to each irradiated area.

13. The light source apparatus according to claim 1, wherein the first optical system is configured to convert the shape of the collimated light from each collimator lens such that a uniform luminance distribution is formed in each irradiated area.

14. The light source apparatus according to claim 1, wherein the optical characteristic conversion element includes a plurality of wavelength conversion elements or a plurality of angular conversion elements, and each wavelength conversion element of the plurality of wavelength conversion elements or each angular conversion element of the plurality of angular conversion elements corresponds to each light source of the plurality of light sources, respectively.

15. A light source apparatus comprising:
  a plurality of light sources each having a light emitting area;
  an optical characteristic conversion element including a wavelength conversion element or an angular conversion element and configured to convert incident lights from the light sources into emitting lights each having a wavelength or a diffusion angle different from that of the incident light;
  a plurality of collimator lenses each provided for each light source and each configured to collimate a divergent light emitted from each light source; and
  a first optical system configured to irradiate the incident lights on the optical characteristic conversion element,
  wherein the first optical system is configured to convert a shape of the collimated light from each collimator lens into a shape non-similar to that of the light emitting area and to irradiate the shape-converted collimated lights as the incident lights to a plurality of irradiated areas on the optical characteristic conversion element, each irradiated area corresponding to each light source,
  wherein the first optical system includes a plurality of hologram elements having a plurality of microstructural surfaces, respectively, and
  wherein each hologram element of the plurality of hologram elements respectively converts the shape of the collimated light from each collimator lens of the plurality of collimator lenses into the shape non-similar to that of the light emitting area by diffracting the collimated light from each collimator lens by each microstructural surface, respectively, and
  wherein each hologram element of the plurality of hologram elements corresponds to each light source of the plurality of light sources, respectively.

16. The light source apparatus according to claim 15, wherein the optical characteristic conversion element includes a plurality of wavelength conversion elements or a plurality of angular conversion elements, and each wavelength conversion element of the plurality of wavelength conversion elements or each angular conversion element of the plurality of angular conversion elements corresponds to each light source of the plurality of light sources, respectively.

17. An image projection apparatus configured to project an image using light modulated by a light modulation element, the image projection apparatus comprising:
  a light source apparatus that includes a plurality of light sources each having a light emitting area, an optical characteristic conversion element including a wavelength conversion element or an angular conversion element and configured to convert incident lights from the light sources into emitting lights each having a wavelength or a diffusion angle different from that of the incident light, a plurality of collimator lenses each provided for each light source and each configured to collimate a divergent light emitted from each light source, and a first optical system configured to irradiate the incident lights on the optical characteristic conversion element; and
  an illumination optical system configured to illuminate the light modulation element by superimposing the emitting light emitted from the optical characteristic conversion element for each incident light from the plurality of light sources,
  wherein the first optical system is configured to convert a shape of the collimated light from each collimator lens into a shape non-similar to that of the light emitting area and to irradiate the shape-converted collimated lights as the incident lights to a plurality of irradiated areas on the optical characteristic conversion element, each irradiated area corresponding to each light source,
  wherein the first optical system includes:
  a fly-eye lens which the collimated light from each collimator lens enters and which divides the collimated light into a plurality of light beams, and a plurality of condenser lenses which superimpose the plurality of light beams on one another and which irradiate the superimposed light beams as incident lights on the plurality of irradiated areas on the optical characteristic conversion element, and wherein each condenser lens of the plurality of condenser lenses corresponds to each light source of the plurality of light sources, respectively.

18. The image projection apparatus according to claim 17, wherein the optical characteristic conversion element includes a plurality of wavelength conversion elements or a plurality of angular conversion elements, and each wavelength conversion element of the plurality of wavelength conversion elements or each angular conversion element of the plurality of angular conversion elements corresponds to each light source of the plurality of light sources, respectively.

19. The image projection apparatus according to claim 17, further comprising a plurality of light source apparatuses, wherein the illumination optical system includes a combining optical system configured to combine lights from the plurality of light source apparatuses with one another and to introduce a combined light into the light modulation element.

20. The image projection apparatus according to claim 17, wherein each of the light emitting area, the irradiated area, and an illumination area by the illumination optical system has a shape that is longer in a first direction than in a second direction orthogonal to the first direction.

* * * * *